United States Patent
Chen et al.

(10) Patent No.: US 10,103,856 B2
(45) Date of Patent: Oct. 16, 2018

(54) TRANSMISSION TIME INTERVAL OPERATION FOR LOW LATENCY

(71) Applicant: QUALCOMM Incorporated, San Diego, CA (US)

(72) Inventors: Wanshi Chen, San Diego, CA (US); Shimman Arvind Patel, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 15/099,364

(22) Filed: Apr. 14, 2016

(65) Prior Publication Data

US 2016/0338046 A1  Nov. 17, 2016

Related U.S. Application Data

(60) Provisional application No. 62/160,383, filed on May 12, 2015.

(51) Int. Cl.
*H04L 5/00* (2006.01)
*H04W 72/12* (2009.01)

(52) U.S. Cl.
CPC ....... *H04L 5/0048* (2013.01); *H04W 72/1268* (2013.01)

(58) Field of Classification Search
None
See application file for complete search history.

(56) References Cited

U.S. PATENT DOCUMENTS

| 9,391,737 | B2* | 7/2016 | Papasakellariou | H04W 72/04 |
| 2011/0149903 | A1* | 6/2011 | Krishnamurthy | H04L 5/0007 |
| | | | | 370/330 |
| 2013/0044664 | A1* | 2/2013 | Nory | H04L 1/0045 |
| | | | | 370/311 |
| 2013/0121273 | A1* | 5/2013 | Kim | H04W 72/042 |
| | | | | 370/329 |
| 2015/0043461 | A1* | 2/2015 | Sachs | H04W 52/0216 |
| | | | | 370/329 |
| 2015/0237604 | A1* | 8/2015 | Shi | H04W 72/042 |
| | | | | 370/330 |
| 2016/0227525 | A1* | 8/2016 | Werner | H04L 1/00 |
| 2016/0316444 | A1* | 10/2016 | Ringh | H04W 56/0015 |

* cited by examiner

*Primary Examiner* — Charles C Jiang
*Assistant Examiner* — Saad Khawar
(74) *Attorney, Agent, or Firm* — Anthony R. Morris

(57) ABSTRACT

Methods, systems, and devices for wireless communication are described. A base station may select, and a user equipment (UE) may identify, an initial symbol of a transmission time interval (TTI) based on a particular characteristic of a communication link between the base station and UE. A two-symbol TTI for one UE may thus be scheduled to align with or complement a longer TTI for another UE. For instance, the initial symbol of a two-symbol TTI may be restricted to certain symbol periods of a Long Term Evolution (LTE) subframe to limit interference with other transmissions scheduled during the subframe (e.g., reference signals, control channels, guard periods, etc.). Additionally or alternatively, a UE may identify and blindly decode control channel transmissions for low latency communications by assuming a presence of reference signals within the symbols that include a low latency control channel.

20 Claims, 20 Drawing Sheets

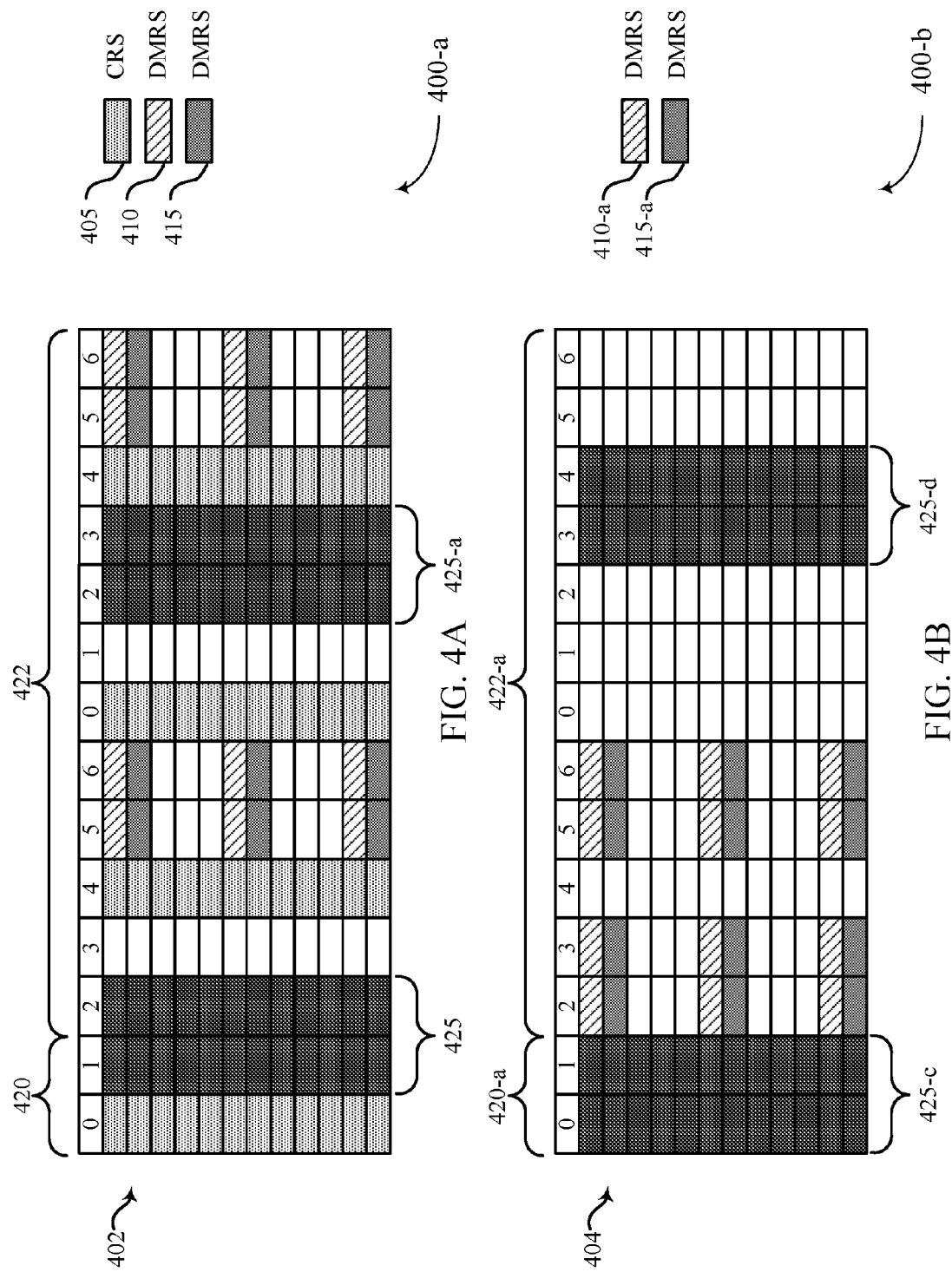

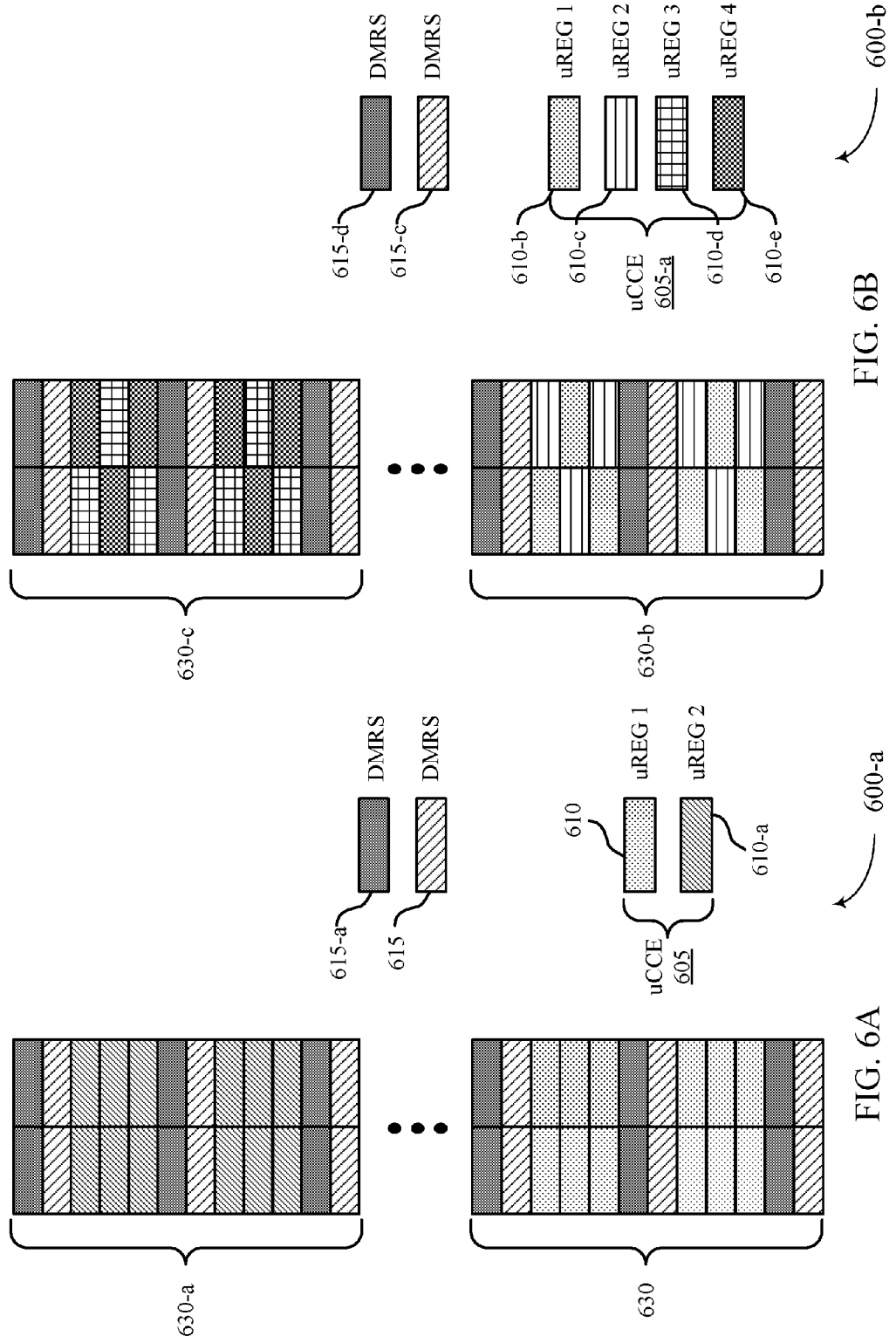

TRANSMISSION TIME INTERVAL OPERATION FOR LOW LATENCY

CROSS REFERENCES

The present application for patent claims priority to U.S. Provisional Patent Application No. 62/160,383, entitled "Transmission Time Interval Operation for Low Latency," filed May 12, 2015, assigned to the assignee hereof.

BACKGROUND

The following relates generally to wireless communication, and more specifically to two-symbol TTI operation for ultra-low latency (low latency) communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A base station and a UE in a system employing multiple-access technology may operate according to a low latency physical (PHY) layer timing structure. Low latency operations (for example, operations based on a reduced transmission time interval (TTI)) may provide for reduced delay between a transmission and a HARQ response, for example. A low latency timing structure may also be configured to operate in concert with other timing structures of a system. This overlaid or parallel operation may introduce certain scheduling issues to be accounted for by a UE and base station. Additionally, in some cases, low latency operation may benefit from or introduce different considerations for identifying and utilizing reference signal.

SUMMARY

A base station may select, and a user equipment (UE) may identify, an initial symbol of a transmission time interval (TTI) based on a particular characteristic of a communication link between the base station and UE. For example, for a two-symbol TTI, the initial symbol location of the TTI may depend on a reference signal type, a channel type, or a direction of the communication link (e.g., uplink or downlink). A two-symbol TTI for one UE may thus be scheduled to align with or complement a longer TTI for another UE. For instance, the initial symbol of a two-symbol TTI may be restricted to certain symbol periods of a Long Term Evolution (LTE) subframe, which may limit the extent to which the two-symbol TTI interferes with other transmissions scheduled during the subframe (e.g., reference signals, control channels, guard periods, etc.). Additionally or alternatively, a UE may identify and blindly decode control channel transmissions for low latency communications by assuming a presence of reference signals within the symbols that include a low latency control channel. This may support low latency operations while minimizing interference with other communications.

A method of wireless communication is described. The method may include determining a communication link characteristic indicative of a first symbol period of a two-symbol TTI. The method may also include identifying a location of the first symbol of the two-symbol TTI and communicating during the first symbol period and a second symbol period of the two-symbol TTI based at least in part on the location of the first symbol.

An apparatus for wireless communication is described. The apparatus may include means for determining a communication link characteristic indicative of a first symbol period of a two-symbol TTI. The apparatus may also include means for identifying a location of the first symbol of the two-symbol TTI and means for communicating during the first symbol period and a second symbol period of the two-symbol TTI based at least in part on the location of the first symbol.

A further apparatus for wireless communication is described. The apparatus may include a processor, memory in electronic communication with the processor, and instructions stored in the memory and operable, when executed by the processor, to cause the apparatus to determine a communication link characteristic indicative of a first symbol period of a two-symbol TTI, identify a location of the first symbol of the two-symbol TTI, and communicate during the first symbol period and a second symbol period of the two-symbol TTI based at least in part on the location of the first symbol.

A non-transitory computer-readable medium storing code for wireless communication is described. The code may include instructions executable to determine a communication link characteristic indicative of a first symbol period of a two-symbol TTI, identify a location of the first symbol of the two-symbol TTI, and communicate during the first symbol period and a second symbol period of the two-symbol TTI based at least in part on the location of the first symbol.

A further method of wireless communication is described. The method may include determining a communication link characteristic indicative of a first symbol period of a two-symbol TTI, selecting a location of the first symbol of the two-symbol TTI, and communicating during the first symbol period and a second symbol period of the two-symbol TTI based at least in part on the location of the first symbol.

A further apparatus for wireless communication is described. The apparatus may include means for determining a communication link characteristic indicative of a first symbol period of a two-symbol TTI, means for selecting a location of the first symbol of the two-symbol TTI based at least in part on the determined communication link characteristic, and means for communicating during the first symbol period and a second symbol period of the two-symbol TTI based at least in part on the location of the first symbol.

A further apparatus for wireless communication is described. The apparatus may include a processor, memory in electronic communication with the processor, and instructions stored in the memory and operable, when executed by the processor, to cause the apparatus to determine a communication link characteristic indicative of a first symbol period of a two-symbol TTI, select a location of the first symbol of the two-symbol TTI, and communicate during the first symbol period and a second symbol period of the two-symbol TTI based at least in part on the location of the first symbol.

A further non-transitory computer-readable medium storing code for wireless communication is also described. The code may include instructions executable to determine a communication link characteristic indicative of a first symbol period of a two-symbol TTI, select a location of the first symbol of the two-symbol TTI, and communicate during the first symbol period and a second symbol period of the two-symbol TTI based at least in part on the location of the first symbol.

A further method of wireless communication is described. The method may include identifying a set of decoding candidates for a control channel with a TTI that is less than a subframe duration, monitoring the set of decoding candidates for the control channel, based at least in part on at least one pre-defined DMRS pattern for each decoding candidate of the set of decoding candidates, and blindly decoding the control channel using the set of decoding candidates and the pre-defined DMRS pattern.

A further apparatus for wireless communication is described. The apparatus may include means for identifying a set of decoding candidates for a control channel with a TTI that is less than a subframe duration, means for monitoring the set of decoding candidates for the control channel, based at least in part on at least one pre-defined DMRS pattern for each decoding candidate of the set of decoding candidates, and means for blindly decoding the control channel using the set of decoding candidates and the pre-defined DMRS pattern.

A further apparatus for wireless communication is described. The apparatus may include a processor, memory in electronic communication with the processor, and instructions stored in the memory and operable, when executed by the processor, to cause the apparatus to identify a set of decoding candidates for a control channel with a TTI that is less than a subframe duration, monitor the set of decoding candidates for the control channel, based at least in part on at least one pre-defined DMRS pattern for each decoding candidate of the set of decoding candidates, and blindly decode the control channel using the set of decoding candidates and the pre-defined DMRS pattern.

A further non-transitory computer-readable medium storing code for wireless communication is described. The code may include instructions executable to identify a set of decoding candidates for a control channel with a TTI that is less than a subframe duration, monitor the set of decoding candidates for the control channel, based at least in part on at least one pre-defined DMRS pattern for each decoding candidate of the set of decoding candidates, and blindly decode the control channel using the set of decoding candidates and the pre-defined DMRS pattern.

In some examples of the methods, apparatuses, or non-transitory computer-readable media described herein, the location of the two-symbol TTI is identified based at least in part on the communication link characteristic and the communication link characteristic determination is based at least in part on a reference signal type, a channel type, a direction of a communication link, or any combination thereof. In some examples, the location of the first symbol of the two-symbol TTI within a subframe is unrestricted.

Some examples of the methods, apparatuses, or non-transitory computer-readable media described herein may include features, steps, means, or instructions for monitoring a control channel in each symbol of a subframe, wherein the subframe includes the two-symbol TTI. In some examples, the control channel comprises a cell-specific reference signal (CRS) based control channel scheduling a CRS-based downlink channel or an uplink channel, or both. In some examples, the location of the first symbol of the two-symbol TTI is restricted to a subset of symbols of a subframe that includes the two-symbol TTI. Additionally or alternatively, the restriction on the location of the first symbol may be based at least in part on a demodulation reference signal (DMRS) pattern of the subframe.

Some examples of the methods, apparatuses, or non-transitory computer-readable media described herein may include features, steps, means, or instructions for a CRS based control channel scheduling a DMRS-based downlink channel, a DMRS-based control channel scheduling a downlink channel, or a DMRS-based control channel scheduling an uplink channel, wherein the communication link characteristic is determined based at least in part on the monitoring. Some examples include determining that the first and second symbols of the two-symbol TTI comprise a data channel, and some examples may include refraining from monitoring a control channel for at least a downlink grant period of the two-symbol TTI.

In some examples, the location of the first symbol of the two-symbol TTI is semi-statically or dynamically determined. In some examples, the location of the first symbol of the two-symbol TTI is based at least in part on a cyclic prefix type or a subframe type, or both. Additionally or alternatively, the location of the first symbol of the two-symbol TTI may be based at least in part on a user equipment (UE) identifier.

Some examples of the methods, apparatuses, or non-transitory computer-readable media described herein may include features, steps, means, or instructions for monitoring a CRS-based channel in a first set of symbols of a subframe comprising the two-symbol TTI. Some examples include monitoring a DMRS-based channel in a second set of symbols of the subframe comprising the two-symbol TTI.

Some examples of the methods, apparatuses, or non-transitory computer-readable media described herein may include features, steps, means, or instructions for identifying a set of decoding candidates for a control channel with a transmission time interval (TTI) that is less than a subframe duration. Some examples may also include monitoring the set of decoding candidates for the control channel, based at least in part on at least one pre-defined demodulation reference signal (DMRS) pattern for each decoding candidate of the set of decoding candidates and blindly decoding the control channel using the set of decoding candidates and the pre-defined DMRS pattern. Additionally or alternatively, some examples include determining that a subsequent control channel in a subsequent TTI comprises information for the UE and blindly decoding the subsequent control channel using a DMRS associated with the pre-defined DMRS pattern. Some examples include monitoring the TTI for a DMRS is based at least in part on a DMRS mode. A resource element group (REG) may comprise resource elements in an RB of the TTI. In some examples, the pre-defined DMRS pattern depends on a subframe type or a cyclic prefix type, or both.

BRIEF DESCRIPTION OF THE DRAWINGS

Aspects of the disclosure are described in reference to the following figures:

FIGS. 4A and 4B illustrate examples of legacy DMRS patterns and that support two-symbol TTI operation for low latency communication in accordance with various aspects of the present disclosure;

FIGS. 6A and 6B illustrate examples of a DMRS based uPDCCH for low latency communication in accordance with various aspects of the present disclosure;

DETAILED DESCRIPTION

Figure 1:
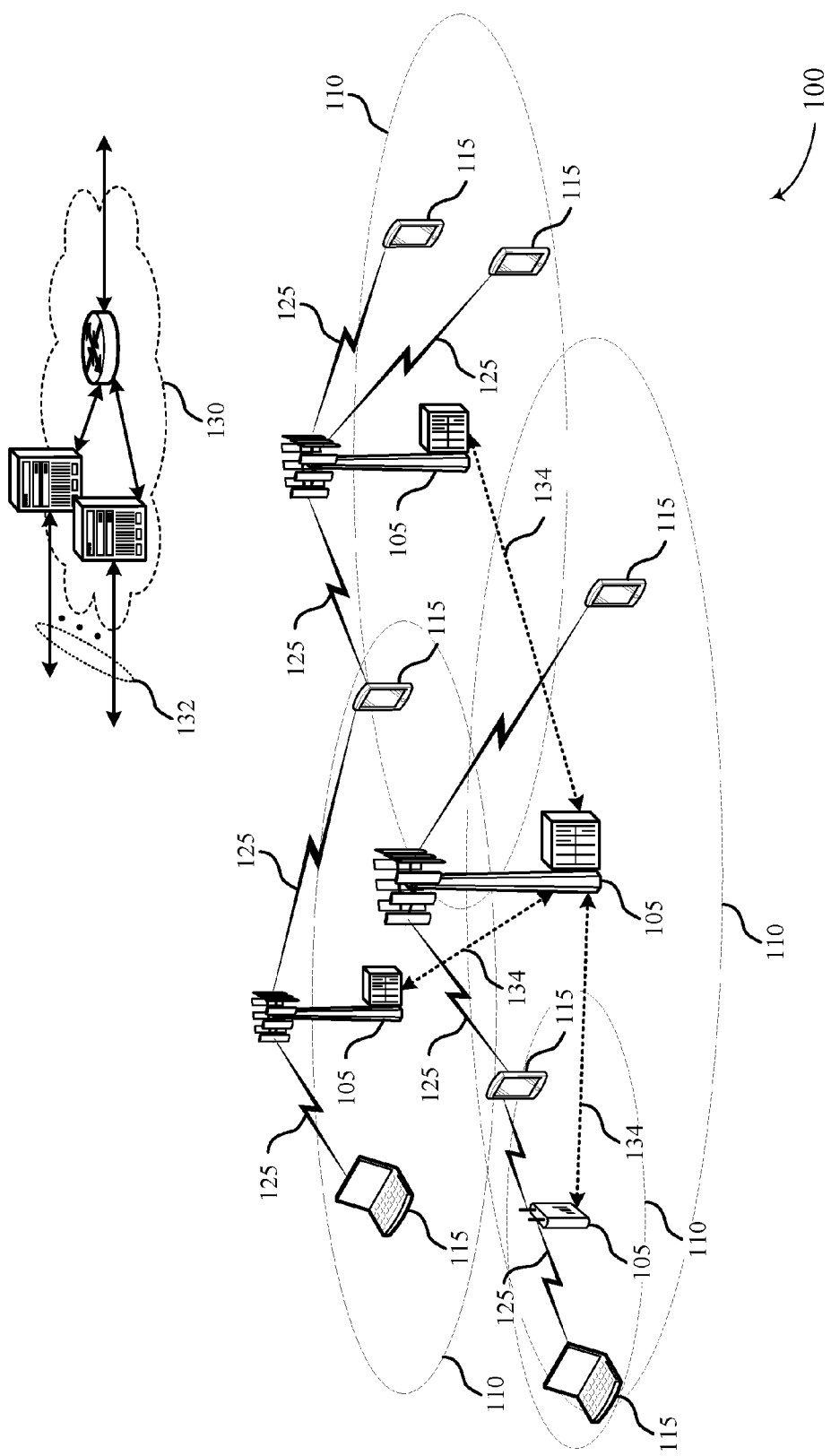
FIG. 1 illustrates an example of a wireless communications system that supports two-symbol TTI operation for low latency communication in accordance with various aspects of the present disclosure.

In some cases, a wireless system may utilize low latency operations. This may be achieved by utilizing a reduced transmission time interval (TTI), as compared with TTIs of other systems or communication schemes. An LTE system, for instance, utilizes a TTI of 1 ms duration, which is referred to as a subframe and which, as discussed below, may include time divisions referred to as symbols or symbol periods. But low latency operations may be employed via TTIs that have a substantially shorter duration than an LTE subframe. A low latency TTI may be just one or two symbols in duration, for example. These low latency TTIs may be scheduled to coexist or complement longer duration TTIs.

The location in time of a low latency TTI—and, more specifically, the initial symbol of a low latency TTI—may be selected or identified based on certain characteristics of a communication link between a base station and a UE. For example, a base station may schedule a two-symbol TTI to correspond with a subframe timing boundary, e.g., a symbol period, of an LIE subframe. That is, the two-symbol TTI may be transmitted so that the first symbol of the TTI is aligned with a particular symbol of the LTE subframe. The location of this starting symbol may be dependent upon, and indicated by, a location of reference signals in the subframe, a cyclic prefix (CP) type, a channel type (e.g., whether a control or data channel is present), whether the subframe is an uplink or downlink subframe, or the like.

A starting symbol for a low latency TTI may be restricted to certain symbol periods of a subframe, or, in some cases, may be unrestricted. For instance, a restriction may be employed based on a demodulation reference signal (DMRS) pattern for a subframe. As discussed below, the starting symbol of the low latency TTI may thus be restricted to every other symbol period in the subframe, but may not overlap a DMRS transmission. Alternatively, the starting symbol of the low latency TTI may be restricted to every other symbol of a slot, where a subframe includes two slots. Other variations are possible; the staring symbol could be in symbols 0, 1, 2, 3, and 5 of each slot for a normal CP, for example.

In addition to selecting certain starting symbols for a low latency TTI, low latency communications may be supported by resource arrangements and decoding procedures that leverage DMRS-based control channel demodulation. While DMRS presence for low latency data channels may be dynamically indicated, dynamically indicating the presence of DMRS for low latency control channel demodulation may negatively impact latency. Accordingly, and as described below, pre-defined DMRS locations in low latency TTIs may be employed; or a UE may be configured to blindly decode a control channel by assuming the presence of DMRS in certain symbols of the TTI.

Aspects of this disclosure are initially described below in the context of a wireless communication system. Specific examples are then described for various communication link-characteristic dependent starting symbol locations for low latency TTIs. Additionally, specific examples for demodulation reference signal (DMRS)-based low latency control channel operation are described. These and other aspects of the disclosure are further illustrated by and described with reference to apparatus diagrams, system diagrams, and flowcharts.

FIG. 1 illustrates an example of a wireless communications system 100 that supports low latency communication in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. In some cases, wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may thus be configured with multiple downlink CCs and one or more uplink CCs for carrier aggregation. Carrier aggregation may be used with both frequency division duplexed (FDD) and time division duplexed (TDD) component carriers.

The base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). In some cases, base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples. The base stations 105 may support and may utilize DMRS-based DL low latency operation to facilitate faster processing of certain delay intolerant communications with low latency capable UEs 115.

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot Ts$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

The communication networks that may accommodate some of the various disclosed examples, including wireless communications system 100 of FIG. 1, may be packet-based networks that operate according to a layered protocol stack and data in the user plane may be based on Internet protocol (IP). A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. In some cases, RRC signaling may be utilized to signal DMRS patterns, including low latency DMRS patterns, and carrier configurations to UEs 115. The RRC protocol layer may also be used for core network 130 support of radio bearers for the user plane data.

Data may be divided into logical channels, transport channels, and physical layer channels. Channels may also be classified into Control Channels and Traffic Channels. DL physical channels may, for example, include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data. In some cases, additional low latency physical channels may be employed to support low latency operations. These may include a low latency PDCCH (uPDCCH) and low latency PDSCH (uPDSCH) in the downlink and low latency PUCCH (uPUCCH) and low latency PUSCH (uPUSCH) in the uplink.

PDCCH may carry downlink control information (DCI) in control channel elements (CCEs), which may consist of nine logically contiguous resource element groups (REGs), where each REG contains 4 resource elements (REs). Likewise, uPDCCH may carry DCI in low latency CCEs (uCCEs), which may consist of low latency REGs (uREGs), examples of which are described below with reference to FIGS. 6A and 6B. DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system such as wireless communications system 100 that employs Multiple Input Multiple Output (MIMO), the DCI may also include additional signaling information. DCI size and format may depend on the amount of information as well as factors such as bandwidth, the number of antenna ports, and duplexing mode being utilized. The size and format of the DCI may determine the number of resources a wireless communications system 100 allocates to the PDCCH or uPDCCH.

The wireless communications system 100 may transmit control information on the PDCCH corresponding to a legacy downlink transmission. The control information may be used by a UE 115 to determine a resource allocation in a following subframe. For instance, a legacy UE 115 may determine a reference signal pattern, what resources are allocated to the PDSCH, and the like for the subframe. The system may additionally transmit a uPDCCH that communicates similar control information corresponding to a low latency transmission, which a low latency UE 115 may use to determine a low-latency resource allocation. A low latency UE 115 may, for instance, determine reference signal pattern, what resources are allocated to the PDSCH, and the like in one or more following symbols (e.g., one symbol TTI, two-symbol TTI, etc.).

According to the present disclosure, a low latency UE 115 may determine a communication link characteristic indicative of a first symbol of a low latency TTI, and the UE 115 may identify a location of the first symbol of the low latency TTI based on the communication link characteristic determination. In various examples, the communication link characteristic determination may be based on a reference signal type, a channel type, a direction of a communication link, or the like. Once determining the starting symbol of the low latency TTI, the UE 115 may communicate during the TTI.

Additionally or alternatively, the wireless communications system 100 may employ uPDCCH such that it does not interfere with the resources allocated to a legacy UE 115. In particular, uPDCCH may be transmitted using resources that do not interfere with the reference signals associated with the legacy transmissions. The uPDCCH may be structured based on whether the uPDCCH is DMRS or CRS based. In some cases, a DMRS-based uPDCCH may be structured using uREGs and uCCEs, as described below. UE 115 may identify a set of decoding candidates from the uCCEs for a uPDCCH in a low latency TTI. The UE 115 may thus monitor the set of decoding candidates based on, for example a pre-defined DMRS pattern, and the UE 115 may blindly decode the uPDCCH using the set of decoding candidates and the pre-defined DMRS pattern.

Figure 2:
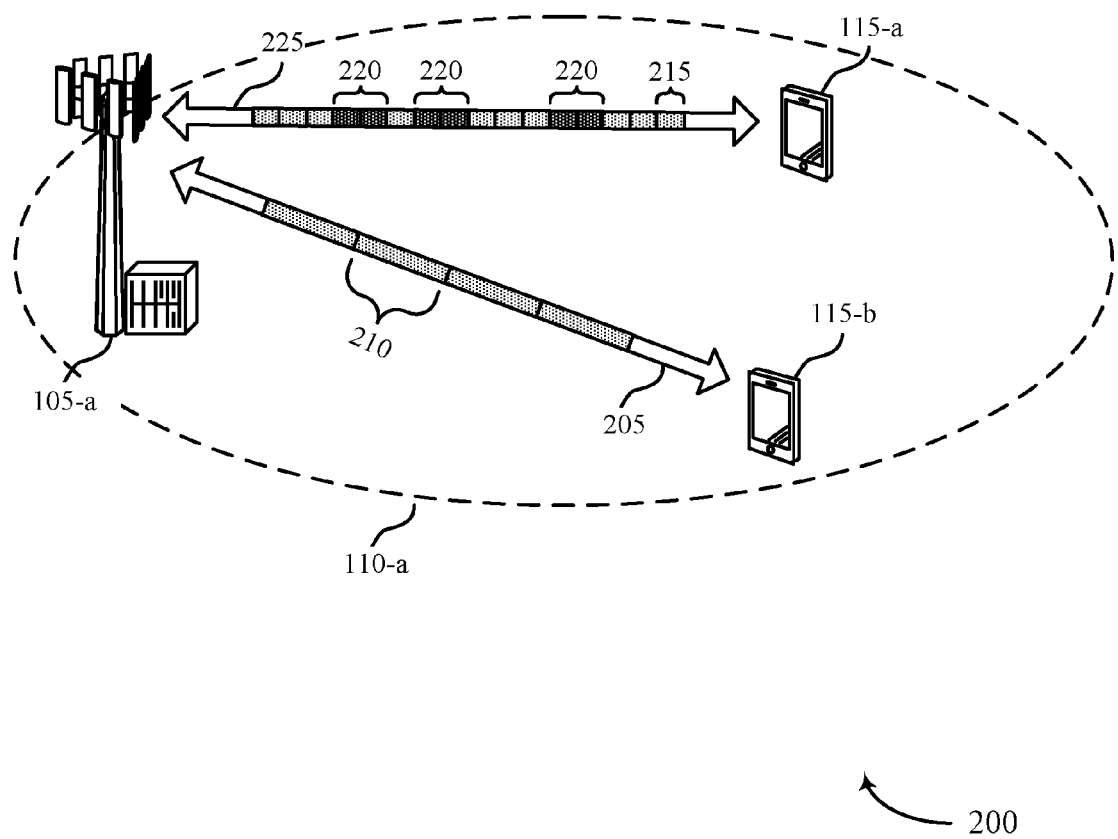
FIG. 2 illustrates an example of a wireless communication system for two-symbol TTI operation for low latency communication in accordance with various aspects of the present disclosure.

FIG. 2 illustrates an example of a wireless communications system 200 that supports low latency communication in accordance with various aspects of the present disclosure. Wireless communications system 200 may include UE 115-*a*, UE 115-*b*, and base station 105-*a*, which may be examples of a UE 115 or a base station 105 described above with reference to FIG. 1. Base station 105-*a* may communicate with UE 115-*b* via communication link 205, which may utilize legacy TTIs 210, and with UE 115-*a* via communications link 225, which may utilize low latency TTIs 215 and 220, when UE 115-*a* is within geographic coverage area 110-*a*, as generally described above with reference to FIG. 1. Low latency TTIs 220 may be two-symbol TTIs as described herein.

Base station 105-*a* may insert periodic pilot symbols, such as CRS, in DL transmissions to aid UEs 115-*a* and 115-*b* in channel estimation and coherent demodulation. CRS may include one of 504 different cell identities. CRS may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (e.g., up to 4) of the receiving UEs 115.

In addition to CRS, which may be utilized by all UEs 115 in the geographic coverage area 110-*a* of the base station 105-*b*, DMRS may also be used, and may be directed toward specific UEs 115-*a* or 115-*b*. That is, DMRS may be transmitted on resource blocks assigned to those UEs 115. DMRS may, for instance, include signals on 6 resource elements in each resource block in which they are transmitted. The DMRS for different antenna ports may each utilize the same 6 resource elements, and may be distinguished using different orthogonal cover codes (OCC) (e.g., masking each signal with a different combination of 1 or −1 in different resource elements). In some cases, two sets of DMRS may be transmitted in adjoining resource elements. In some cases, DMRS may be transmitted according to a predefined pattern. That is, DMRS may be sent during certain symbols of a subframe-duration TTI 210 (e.g., symbols 5 and 6). DMRS may also be referred to by those skilled in the art as a UE-specific reference signal ("UE-RS" or "UERS").

Additional reference signals, known as channel state information reference signals (CSI-RS), may also be included to aid in generating channel state information (CSI). On the UL, a UE 115 may transmit a combination of periodic sounding reference signal (SRS) and UL DMRS for link adaptation and demodulation, respectively.

Figure 3:
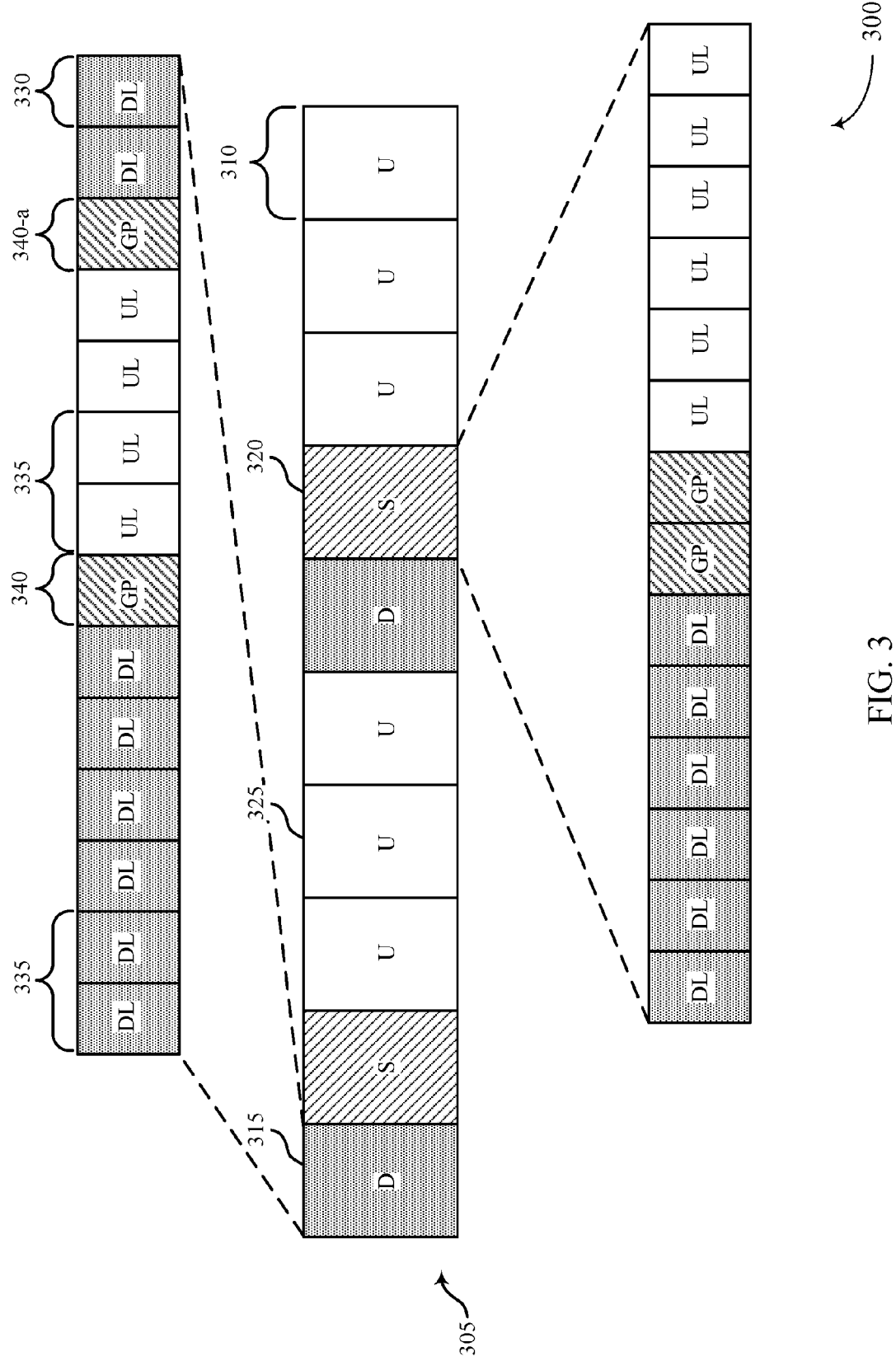
FIG. 3 illustrates an example of a frame configuration for two-symbol TTI operation for low latency communication in accordance with various aspects of the present disclosure.

A frame structure may be used within the wireless communications system 200 to organize physical resources. A frame may be a 10 ms interval that may be further divided into 10 equally sized subframes, as depicted in FIG. 3. Each subframe may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a CRS and DMRS as described above. The number of bits carried by each resource element may depend on the modulation scheme (the configuration of symbols that may be selected during each symbol period). Thus, the more resource blocks that a UE receives and the higher the modulation scheme, the higher the data rate may be for the UE. Further details of a frame, subframe, and symbol structure that may be utilized by wireless communications system 200 are illustrated by and described with reference to FIGS. 3-5.

In some cases, and as discussed above, an LTE subframe, such as TTI 210, may be the smallest scheduling unit, also known as a transmission time interval (TTI). In other cases, a TTI may be shorter than a subframe or may be dynamically selected (e.g., in short TTI bursts or in selected component carriers using short TTIs). Wireless communications system 200 may employ TTIs of varying lengths to communicate with low latency and legacy UEs 115. For low latency or low latency operation, TTIs with short durations, such as two-symbol TTI 220, may be employed. In some cases, using shorter length TTIs may reduce over-the-air latency. For example, one-symbol TTI 215 or two-symbol TTIs 220, which may have a duration of one and two LTE symbol periods, respectively, may help reduce HARQ latency as compared with legacy TTIs 210 (e.g., an LTE subframe). For instance, wireless communications system 200 may reduce HARQ latency from 4 ms to 600 μs by employing two-symbol TTIs 220. By way of example, for normal cyclic prefix (CP) operation, HARQ latency may be reduced by a factor of seven (7) by using TTIs on the order of symbol period. While if an extended CP is used, HARQ latency may be reduced by a factor of six (6). Such latency gains may be realized while maintaining compatibility with legacy operation because, as illustrated in FIGS. 3-5 below, wireless communications system 200 may utilize LTE numerology for low latency operation such that the two-symbol TTI duration may be different while tone spacing and symbol duration may be the same. That is, a two-symbol TTI configuration may use the same tone spacing (e.g., 15 kHz) and symbol duration (e.g., approximately 71 μs for a normal CP) as a legacy TTI configuration.

FIG. 3 illustrates an example of a frame configuration 300 for two-symbol TTI operation for low latency communication in accordance with various aspects of the present disclosure. Frame configuration 300 may illustrate aspects of a transmission between a UE 115, such as low latency or legacy UE 115, and a base station 105, as described above with reference to FIGS. 1 and 2. Frame configuration 300 may include a frame 305, which may include a number of low latency subframes 310 scheduled for downlink or uplink. Low latency subframes 310 may be examples of legacy TTIs 210 as described with reference to FIG. 2. In some case, transmissions using frame 305 may be configured to support low latency operation using short duration TTIs. Frame 305 may be used in a FDD or TDD system.

Frame 305 may include a number of subframes configured as low latency downlink subframes 315 and low latency uplink subframes 325. In some cases, frame 305 may include both low latency subframes and non-low latency subframes. The distribution of low latency downlink subframes 315 and low latency uplink subframes 325 may be determined by a base station 105 according to predefined uplink/downlink TDD configurations, for example. Between the low latency downlink subframes 315 and the low latency uplink subframes 325, the base station may not schedule any information. Such scheduling gaps may allow a UE 115 to transition from a downlink setup to an uplink setup. Thus, frame 305 may include special subframes 320 which act as guard periods for occasions when communication direction changes (e.g., from downlink to uplink).

Low latency subframes 310 may be partitioned into smaller segments—that is, larger TTIs, such as subframes, may include smaller TTIs, such as two-symbol TTIs 335. For example, low latency subframes 310 may include a number of low latency symbols 330. Two low latency symbols 330 may be combined to form a two-symbol TTI 335. A two-symbol TTI may be scheduled to convey downlink data (e.g., downlink symbols) or uplink data (e.g., uplink symbols). In some low-latency configurations, a base station 105 may schedule the low latency symbols 330 of a low latency subframe 310 according to the same or different direction as a low latency subframe 310. A HARQ process may be performed at the symbol-level (e.g., within a low latency subframe 310). Two-symbol TTIs may allow a system to, in the UL, more readily implement frequency hopping while maintaining a single carrier waveform (e.g., an approximation of an SC-FDM waveform).

In some cases, a base station 105 may schedule gaps between communication direction changes at the symbol-level (e.g., the gaps may be within a low latency subframe 310). For example, a base station 105 may schedule guard periods 340 and 340-a, which may allow a low latency UE 115 to change configurations.

A base station 105 may use control signaling to support different TTI configurations or to support low latency operation. For instance, a base station 105 may signal to a low latency UE 115 which two-symbol TTIs 335 are for downlink and may include DMRS symbols in the same or a prior TTI. The base station 105 may schedule TTIs based on two symbol intervals, such as DL or UL two-symbol TTIs 335.

Frame 305 may include DMRS in many instances; but the use of DMRS for uPDCCH or uPDSCH demodulation may vary within a frame 305 or subframe 310 or on a per TTI basis or in different frequency resources within a TTI. For example, DMRS may be present in certain subframes 310, or sets (e.g., groups) of subframes 310 of a frame 305. One subframe 310 may not include DMRS (e.g., uPDCCH CRS-based demodulation may be used), while a second subframe may include DMRS for DMRS-based uPDSCH modulation within that subframe 310. In some examples, the presence of DMRS for uPDSCH may be defined in terms of resource blocks or a subset of resources blocks. For example, a first resource block of a subframe 310 may not include DMRS-based uPDSCH (e.g., CRS-based uPDCCH demodulation may be employed) while a second resource block of the subframe may include DMRS to support DMRS-based uPDSCH demodulation. In such cases, a low latency UE 115 may monitor a first uPDCCH search space in a symbol period based on DMRS. The low latency UE 115 may also monitor a second uPDCCH search space based on CRS included in the same symbol period. In some cases, the monitoring may be simultaneous. Additionally or alternatively, the low latency UE 115 may simultaneously monitor a first uPDCCH search space in a first symbol period based on DMRS and a second uPDCCH in a second symbol period based on CRS.

FIGS. 4A and 4B illustrate examples of subframe structures 400-a and 400-b that support two-symbol TTI operation for low latency communications in accordance with various aspects of the present disclosure. Subframe structures 400-a and 400-b may illustrate aspects of a transmission between UEs 115, such as low latency and legacy UEs 115, and a base station 105, as described above with reference to FIGS. 1-3. Subframe 402 may be an example a subframe 310 described with reference to FIG. 3, and may illustrate a TTI of a carrier utilized in wireless communications system 100 or 200 of FIGS. 1 and 2. Subframe 402 may include a number of symbol periods (e.g., 12 or 14), six (6) or seven (7) in each slot, which may support low latency operation. Subframe 402 may include CRS symbols 405 and DMRS symbols 410 and 415. Subframe 402 may include a control region (e.g., PDCCH) 420 and a data region (e.g., PDSCH) 422. In the example of FIG. 4, DMRS symbols 410 and 415 may be transmitted in data region 422 in symbol periods 5 and 6 of each slot. DMRS symbols 410 may, for instance, be legacy DMRS of antenna ports 7 and 9, while DMRS symbols 415 may be legacy DMRS symbols 415 of antenna ports 8 and 10.

DMRS of different antenna ports may be multiplexed according to various schemes: code division multiplexing (CDM) in time, CDM in frequency, or frequency division multiplexing (FDM). As used here, CDM in time may refer to OCC described above. For instance, an antenna port may be CDM in time utilizing an OCC for two adjacent symbols that include DMRS.

Subframe 402 may additionally support two-symbol TTIs 425. A network may schedule two-symbol TTIs 425 so that they do not interfere with CRS or DMRS transmissions to legacy devices. For instance, two-symbol TTI 425 may begin in symbol period 1 of the first slot, while two-symbol TTI 425-a may begin in symbol period 2 of the second slot. In some cases, a two-symbol TTI 425 that is based on DMRS may co-exist with legacy DMRS and be transmitted in symbol period 5 of either slot. FIG. 4B illustrates a subframe structure 400-b within a special subframe 404, which may be an example of a special subframe 320. The special subframe 404 may include DMRS symbols 410-a and 415-a that begin in symbol period 2 and 5 of subframe 404. In some cases, the DMRS symbols 410-a and 415-a may begin in symbol 2 of slot 1 and symbol 2 of slot 2. The starting symbols for the two-symbol TTIs 425 may be chosen to prevent interference with legacy DMRS transmissions. As discussed above, the starting symbol of a DMRS-based two-symbol TTI may be aligned with the starting symbol of a legacy DMRS.

Figure 5A:
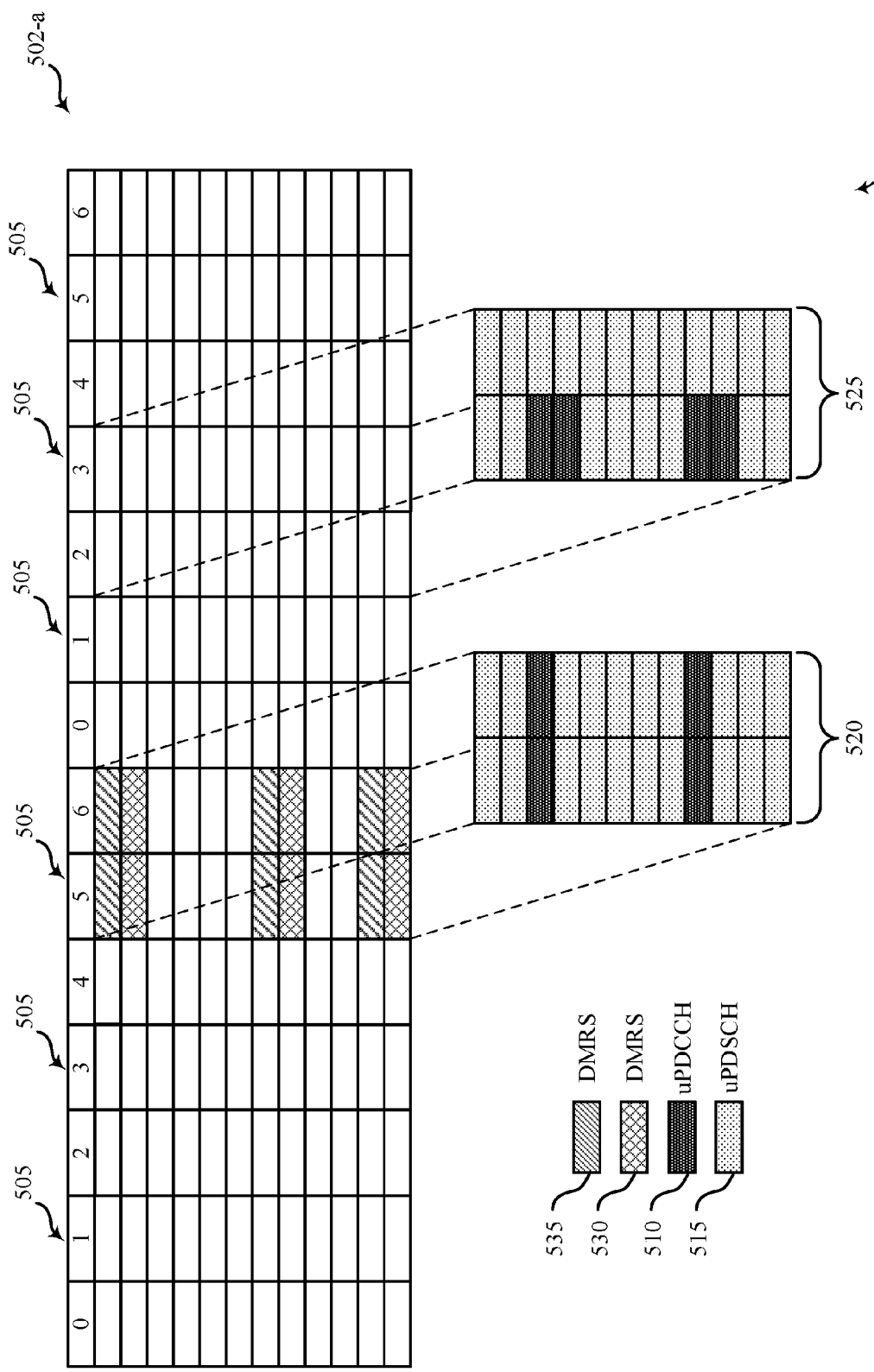
FIGS. 5A and 5B illustrate examples of a subframe structure for two-symbol TTI operation for low latency communication in accordance with various aspects of the present disclosure.

FIG. 5A illustrates an example of a subframe structure 500-a for two-symbol TTI operation for low latency communications in accordance with various aspects of the present disclosure. Subframe structure 500-a may illustrate aspects of a transmission between UEs 115, such as low latency and legacy UEs 115, and a base station 105, as described above with reference to FIGS. 1 and 2. Subframe structure 500-a may be an example of subframe structures 400-a and 400-b. Subframe structure 500-a may include subframe 502-a, potential starting symbols 505, DMRS-based two-symbol TTI (DM-TTI) 520, and CRS-based two-symbol TTI (C-TTI) 525. The DMRS-based two-symbol TTI 520 and CRS-based two-symbol TTI 525 may include uPDCCH symbols 510 and uPDSCH symbols 515. DMRS-based two-symbol TTI 520 and CRS-based two-symbol TTI 525 may also be referred to as DMRS and CRS-based two-symbol uPDCCH/uPDSCH.

DM-TTI 520 may include a two-symbol DMRS-based uPDCCH that schedules the uPDSCH. A two-symbol uPDCCH may support CDM techniques and may be compatible with legacy DMRS patterns. In some cases, DM-TTI 520 may utilize a one-symbol DMRS-based uPDCCH. In one example, the starting symbol of DM-TTI 520 may be aligned with every other symbol period of a slot for subframe 502-a, at potential starting symbols 505. This may align DM-TTI 520 with legacy DMRS 530 and 535 transmissions, as shown in FIG. 4A. Alternatively, the starting symbol of DM-TTI 520 may potentially be aligned with every other symbol period in subframe 502-*a* (e.g., 0, 2, 4, 6, 1, 3, 5), which may mitigate interference with legacy DMRS transmission associated with special subframe 404 as described with reference to FIG. 4B. In yet another example, a DM-TTI 520 may be aligned with any symbol period (e.g., 0-6) based on alternative legacy subframe structures. As mentioned above, the starting symbol selected for the DM-TTI 520 may be selected to mitigate interference with legacy transmissions in subframe 502-*a*.

The starting symbol for C-TTI 525 may similarly be selected. C-TTI 525 may include a one-symbol CRS-based uPDCCH that schedules the uPDSCH. A one-symbol CRS-based uPDCCH may be located in the first symbol of C-TTI 525. This may enable early decoding by a low latency UE 115. Alternatively, the uPDCCH may be placed in the second symbol or in both the first and second symbols of C-TTI 525. A low latency UE 115 may rate match data received on the uPDSCH to take into account the presence of the uPDCCH. In some cases, subframe 502-*a* may utilize an extended CP. The number of symbols may therefore be 14 rather than 12; however, similar techniques may be applied. For instance, as above, the starting symbol of a two-symbol TTI may be any symbol within the subframe, every other symbol within a slot, or every other symbol within subframe 502-*a*.

Figure 5B:
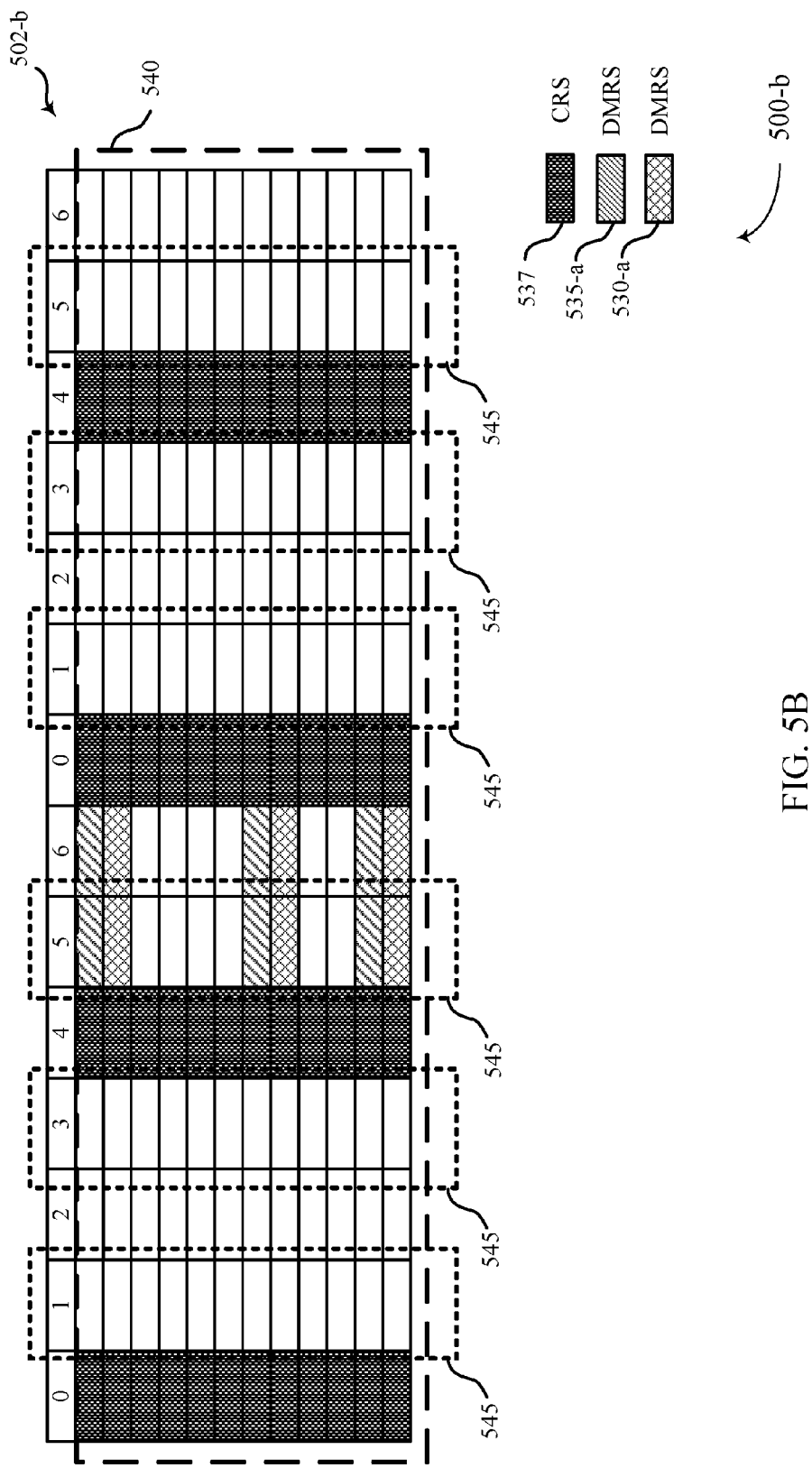

FIG. 5B illustrates an example of a subframe structure 500-*b* for two-symbol TTI operation for low latency communications in accordance with various aspects of the present disclosure. Subframe structure 500-*b* may illustrate aspects of a transmission between UEs 115, such as low latency and legacy UEs 115, and a base station 105, as described above with reference to FIGS. 1-2. Subframe structure 500-*b* may be an example of subframe structures 400-*a* and 400-*b*. Subframe structure 500-*b* may include subframe 502-*b*, CRS window 540, and DMRS window 545. A UE 115 may monitor for a DMRS or CRS based TTI, such as C-TTI 525 or DM-TTI 520, as described with reference to FIG. 5A.

As depicted in the example of FIG. 5B, a low latency UE 115 may monitor subframe 502-*b* for a uPDCCH during pre-determined windows based on whether a two-symbol TTI is DMRS- or CRS-based, and based on which starting symbols patterns are available for the transmission. For instance, a C-TTI 525 may potentially be aligned with any symbol period within subframe 502-*b* while a DM-TTI 520 may be aligned with every other symbol period in a slot. A low latency UE 115 may determine that a C-TTI 525 includes a CRS-based uPDCCH that schedules either a CRS-based uPDSCH or a DM-RS based uPDSCH. The low latency UE 115 may then determine that C-TTI 525 may be aligned with any symbol period in subframe 502-*b*. Accordingly, low latency UE 115 may monitor each symbol in the subframe for the uPDCCH as illustrated by CRS window 540. Although not shown, after detecting a uPDCCH, the UE 115 may determine the resources that are allocated to the uPDCCH, and may use CRS 537 to demodulate uPDCCH.

In another example, a UE 115 may receive a two-symbol TTI that includes a CRS-based uPDCCH and a DMRS-based uPDSCH or alternatively a DMRS-based uPDCCH, such as DM-TTI 520. In such cases, the starting symbol of DM-TTI 520 may be aligned with every other symbol in a slot. This may align DM-TTI 520 with legacy DMRS 530 and 535 transmissions. Accordingly, the low latency UE 115 may monitor certain symbols for the uPDCCH as illustrated by DMRS windows 545; and, although not shown may demodulate DMRS-based uPDCCH using DMRS 530-*a* or 535-*a*. In some cases, a low latency UE 115 may monitor for both CRS and DMRS-based uPDCCH. The low latency UE 115 may thus limit the number of decoding candidates to reduce the number of blind decodes. For instance, a low latency UE 115 may monitor CRS decoding candidates associated with aggregation level 8 and DMRS candidates associated with aggregation levels 1 and 2. In some cases, a CRS-based uPDCCH may be used during an initial transmission while a DMRS-based UPDCCH may be used for improved uPDCCH operation—e.g., under reliable CSI feedback conditions.

The location of the starting symbol may be dynamically determined. For instance, a low latency UE 115 may determine that the two-symbol TTI is present in symbols n and n+1. After this determination, the UE 115 may skip decoding the uPDCCH in symbols n+1 for downlink grants and skip decoding the uPDCCH in symbols n+1−k for UL grants, where k is the scheduling timing for uplink grants. In some cases, the starting symbol may be selected on a UE-by-UE basis.

FIG. 6A illustrates an example of resources that support DMRS-based uPDCCH 600-*a* for low latency communications in accordance with various aspects of the present disclosure. DMRS-based uPDCCH 600-*a* may include DMRS 615 and 615-*a*, uCCE 605, and uREGs 610 and 610-*a*. DMRS-based uPDCCH 600-*a* may be distributed across one or more RBs 630 and 630-*a*. (In the interest of conciseness, the DMRS-based uPDCCH 600-*a* may be referred to as a uPDCCH 600-*a* in the following description.)

In some cases, 12 REs per RB may be allocated to DMRS 615, and the remaining 12 resources may be assigned to the uPDCCH 600-*a*. A uPDCCH 600-*a* may have a payload size of 36 bits. Therefore, using QPSK modulation and a 1/3 coding rate, the uPDCCH 600-*a* may use 54 REs. Similarly at a 1/2 coding rate, the uPDCCH 600-*a* may use 36 REs. A uPDCCH 600-*a*, with a 36 bit payload may thus be distributed amongst 4-5 RBs or 3 RBs, depending on the coding rate. Spreading the uPDCCH 600-*a* across multiple RBs may provide frequency diversity. The uPDCCH 600-*a* may be constructed based on uREGs that consist of 12 REs. A uCCE may include two uREGs, such as uREG 610 and uREG 610-*a*, and a total of 24 REs. Therefore, a uREG may span a RB and a uCCE, such as uCCE 605, may be distributed across two RBs, such as RB 630 and 630-*a*. A low latency UE 115 may determine a set of decoding candidates (i.e., locations where a UE 115 may search for control information) based on uCCE 605. In some cases, low latency UE 115 may aggregate multiple uCCEs 605 into aggregate uCCEs to create a second set of decoding candidates (e.g., 2, 4, or 8 uCCEs/aggregate uCCE).

In one example, the distribution of the uREGs 610 may be localized such that the uREGs 610 are located in adjacent RBs 630. For instance, in the case of an RB that includes a single DMRS port. The DMRS port may be UE-specific to allow MU-MIMO uPDCCH operation in a RB. In some cases, the uREGs 610 may be located in RBs 630 that are not adjacent but are separated by a few RBs 630. In another example, the uREGs 610 may be dispersed over different non-contiguous RBs 630. For instance, in the case of a RB 630 that includes two DMRS ports. In some cases, some of the uREGs 610 may be adjacent to one another. A low latency UE 115 may be configured to monitor both a first set of RBs 630 corresponding to a localized uPDCCH and a second set of RBs 630 corresponding to a distributed set of uPDCCH.

The presence of the uPDCCH 600-a may be indicated dynamically to a low latency UE 115, although other options may be preferable. Accordingly, uPDCCH 600-a may be organized in pre-defined locations that can be indicated to a low latency UE 115. In another example, a low latency UE 115 may blindly decode a uCCE associated with a decoding candidate to determine if the uPDCCH 600-a is intended for that UE 115, and may assume a presence of DMRS. If the uPDCCH is intended for the low latency UE 115, the low latency UE 115 may then decode the uPDCCH 600-a based on a DMRS pattern. In some cases, the low latency UE 115 may utilize previous DMRS received in earlier symbols to decode the current uPDCCH.

FIG. 6B illustrates an example of a DMRS-based uPDCCH 600-b for low latency communications in accordance with various aspects of the present disclosure. DMRS-based uPDCCH 600-b may include DMRS 615-c and 615-d, uCCE 605-a, and uREGs 610-b, 610-c, 610-d, and 610-e. DMRS-based uPDCCH 600-b may be distributed across one or more RBs 630-b and 630-c. The DMRS-based uPDCCH 600-b may be referred to as uPDCCH 600-b in the following description in the interest of conciseness.

In some cases, 12 REs per RB may be allocated to DMRS, and the remaining 12 resources may be assigned to the uPDCCH 600-b. The uPDCCH 600-b may be constructed based on uREGs that consist of six (6) REs. A uCCE 605-a may include four (4) uREGs and a total of 24 REs. Therefore, two uREGs 610 may span a RB and a uCCE may be distributed across two RBs, such as RB 630-b and RB 630-c. In one example, the resources assigned to two uREGs, such as uREG 610-b and uREG 610-c, may be interleaved within a RB, such as RB 630-b. In another example, the resources may be assigned such that a first uREG 610-b is within the first symbol period of RB 630-b and the second uREG 610-c is within the second symbol period of RB 630-b. In the case of a one-symbol DMRS-based uPDCCH, a uREG that is composed of six (6) REs may span a one-symbol RB. A low latency UE 115 may similarly monitor a channel for the presence of the UPDCCH 600-b, as described above.

Figure 7:
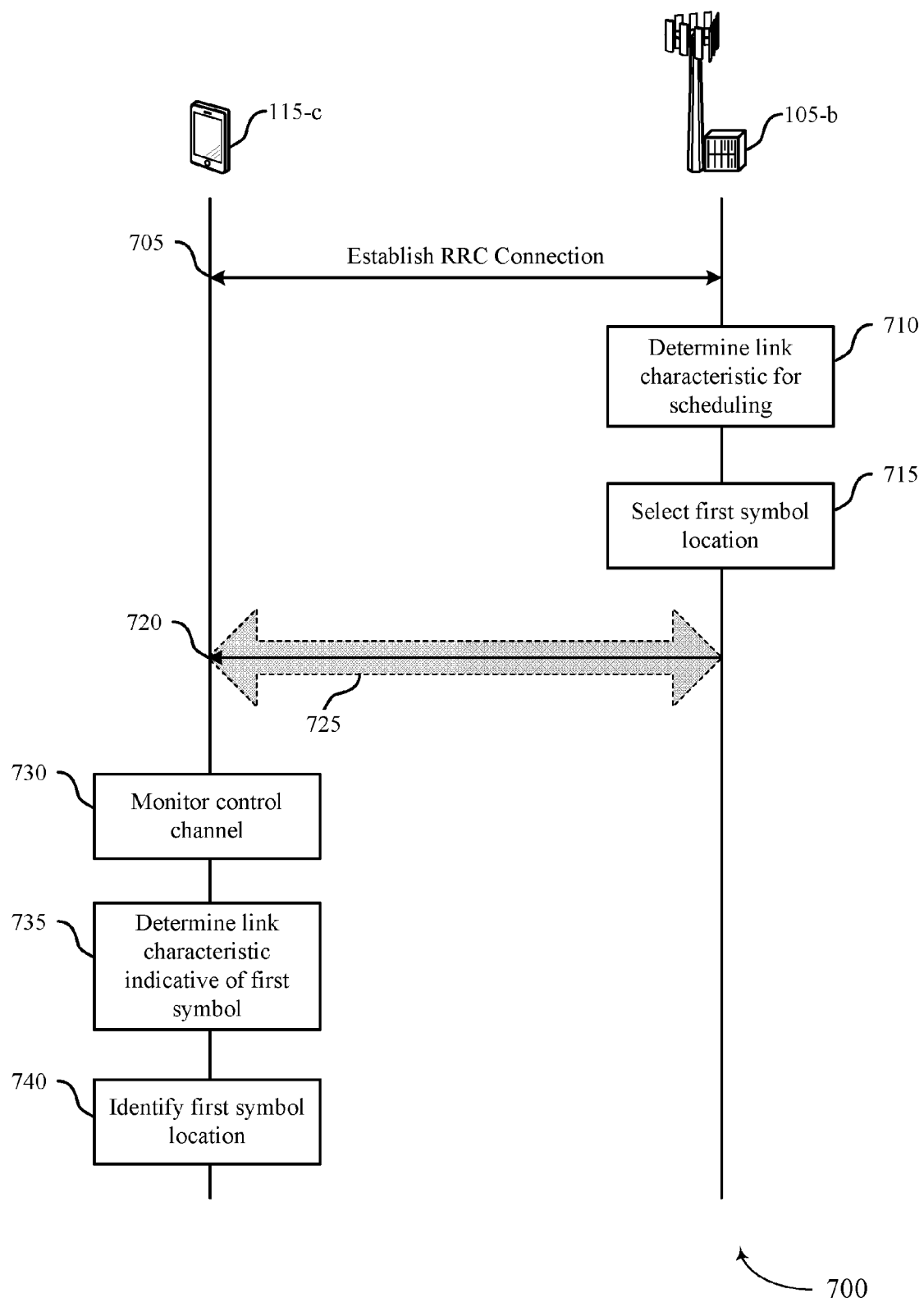
FIGS. 7 and 8 illustrate examples of process flows that support low latency communication in accordance with various aspects of the present disclosure.

FIG. 7 illustrates an example of a process flow 700 that supports low latency communications in accordance with various aspects of the present disclosure. Process flow 700 may include steps or signaling performed by UE 115-c and base station 105-b, which may be examples of a UE 115 or base station 105 described above with reference to FIGS. 1 and 2. In some examples, a base station 105-b may transmit a two-symbol TTI transmission to a low latency UE 115-c using resources that are also available for legacy transmissions. UE 115-c may identify the location of the two-symbol transmission within a legacy subframe or slot, for example.

At 705, base station 105-b may establish an RRC Connection with UE 115-c. The RRC connection may configure UE 115-c to receive low latency communications, such as two-symbol TTI transmissions. In some cases, UE 115-c may signal a two-symbol TTI capability to the base station 105-b.

At 710, base station 105-b may determine a communication link characteristic in order to schedule a two-symbol TTI transmission for UE 115-c. In some cases, base station 105-b may determine the two-symbol TTI transmission based on a communication link characteristic that is indicative of a first symbol of a two-symbol TTI. The communication link characteristic may be a reference signal type, a channel type, or a direction of a communication link.

At 715, base station 105-b may select a location for the first symbol of the two-symbol TTI based on the determined communication link characteristic. In some examples, the location of the first symbol of the two-symbol TTI within a subframe is unrestricted by, for example, operator policy, parameters, or the like. In other examples, the location of the first symbol of the two-symbol TTI may be restricted to a subset of symbols of a subframe (e.g., every other symbol in a slot or every other symbol in a subframe). In some examples, the restriction is based on a DMRS pattern of the subframe. In other examples, the location of the first symbol of the two-symbol TTI is semi-statically or dynamically determined. In some cases, the location of the first symbol of the two-symbol TTI is based on a cyclic prefix type or a subframe type, or both. Additionally or alternatively, the location of the first symbol of the two-symbol TTI may be based on a UE identifier.

At 720, base station 105-b may communicate with UE 115-c during the first symbol and second symbol of the two-symbol TTI based on the selected location. In some cases, the two-symbol TTI transmission sent at 720 may be transmitted within a legacy TTI structure 725. For instance, the two-symbol transmission may be sent so that it is aligned with a symbol within a subframe and alongside legacy reference signals, such as CRS or DMRS.

At 730, UE 115-c may monitor a control channel in each symbol of a subframe associated with a transmission that includes legacy TTI structure 725. In some examples, the control channel includes a CRS-based control channel scheduling a CRS-based downlink channel or an uplink channel, or both. In other examples, UE 115-c may monitor a CRS-based control channel scheduling a DMRS-based downlink channel, a DMRS-based control channel scheduling a downlink channel, or a DMRS-based control channel scheduling an uplink channel. UE 115-c may monitor a CRS-based channel in a first set of symbols of a subframe and a DMRS-based channel in a second set of symbols. In some examples, the second set of symbols is a subset of the first set of symbols. In some cases, monitoring the CRS-based channel includes blindly decoding a first subset of possible decoding candidates and monitoring the DMRS-based channel includes blindly decoding a second subset of possible decoding candidates. In some cases, UE 115-c may refrain from monitoring a control channel for at least a downlink grant period of the two-symbol TTI. In other cases, UE 115-c may monitor a control channel based on a semi-static pattern, a cyclic prefix or subframe type, or a UE identifier.

At 735, UE 115-c may determine a communication link characteristic indicative of a first symbol of a two-symbol TTI transmission from base station 105-b based on the monitoring. The UE 115-c may detect the two-symbol TTI based on the communication link characteristic, such as a reference signal type, a channel type, or a direction of a communication link.

At 740, UE 115-c may identify a location of the first symbol of the two-symbol TTI based on the determined communication link characteristic. The UE 115-c may also determine that the first and second symbols to the two-symbol TTI include a data channel.

Figure 8:
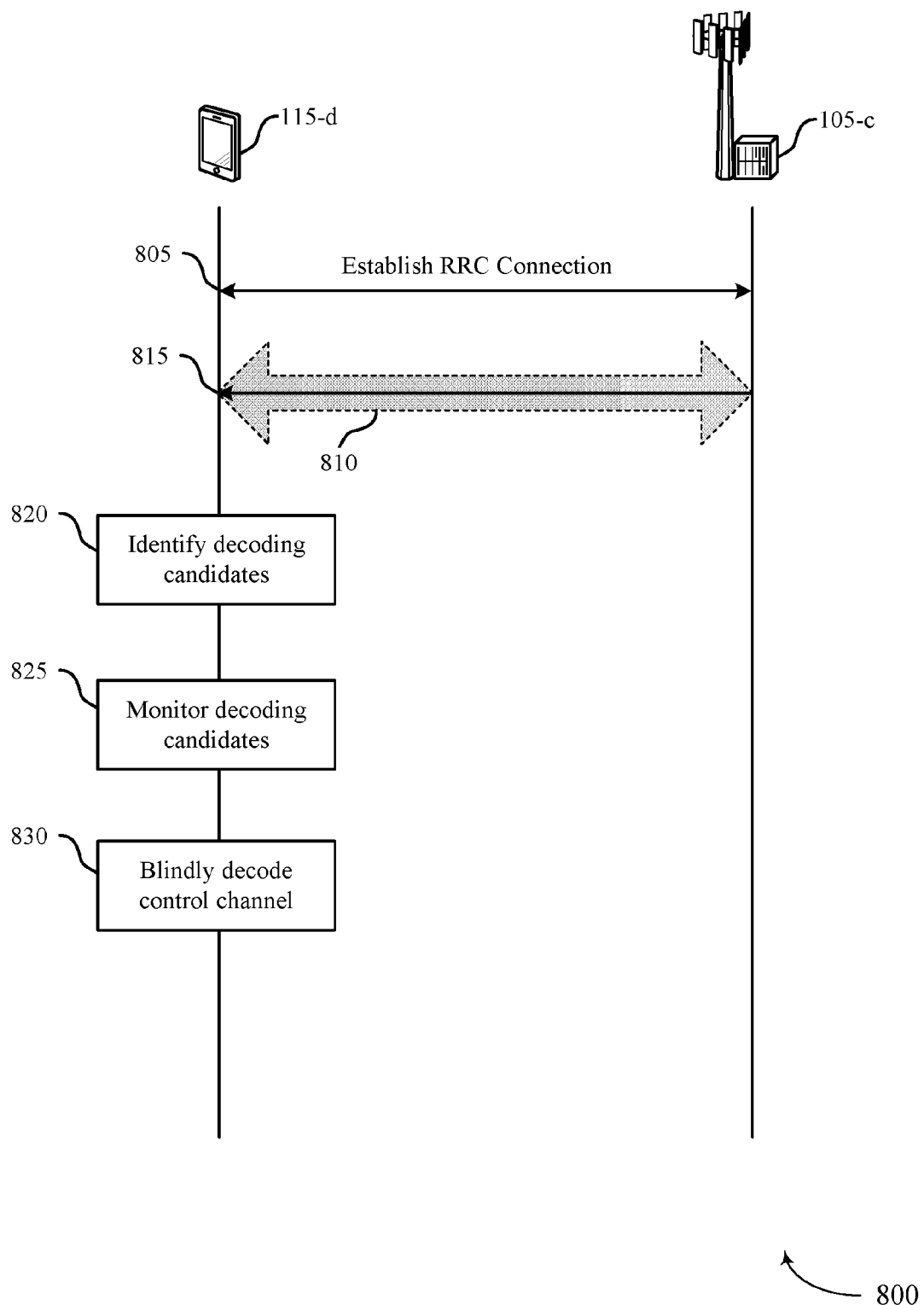

FIG. 8 illustrates an example of a process flow 800 that supports low latency communications in accordance with various aspects of the present disclosure. Process flow 800 may include steps performed by UE 115-d and base station 105-c, which may be examples of a UE 115 or base station 105 described above with reference to FIGS. 1-2. In some examples, UE 115-d blindly decode a control channel transmitted by base station 105-c alongside a legacy transmission. The UE 115-d may blindly decode the control channel based on a set of decoding candidates.

At 805, base station 105-c may establish an RRC Connection with UE 115-d. The RRC connection may configure UE 115-d to receive low latency communications such as two-symbol TTI transmissions or a two-symbol control channel. In some cases, UE 115-d may signal a two-symbol TTI capability to the base station 105-c.

At 810, base station 105-c may send a transmission to UE 115-d that is associated with a TTI that is less than a subframe duration. In some cases, the transmission is a low latency transmission, such as a single-symbol or a two-symbol TTI transmission. For instance, the two-symbol transmission may be a control channel with a TTI that is shorter than a subframe (e.g., a DMRS based uPDCCH). The low latency transmission sent at 815 may be transmitted within a legacy transmission TTI structure 810. For instance, the transmission may be transmitted so that it is aligned with a symbol period within a subframe and alongside legacy reference signals, such as CRS or DMRS.

At 820, UE 115-d may identify a set of decoding candidates for the two symbol transmission. The decoding candidates may be associated with one or more uCCEs and/or uREGs.

At 825, UE 115-d may monitor the set of decoding candidates for the control channel, based on a pre-defined DMRS pattern for each decoding candidate of the set of decoding candidates. Monitoring the transmission for a DMRS may be based on a DMRS mode. In some examples, the DMRS mode includes a first mode that includes a DMRS port for each RB in a set of RBs or a second mode that includes more than one DMRS port for each RB in a set of RBs. In some examples, the monitoring includes monitoring a first set of RBs using the first mode and a second set of RBs using the second mode. In some examples, a REG includes REs in a RB of the TTI. In some examples, the pre-defined DMRS pattern depends on a subframe type, a cyclic prefix type, or any combination thereof.

At 830, UE 115-d may blindly decode the control channel using the set of decoding candidates and the pre-defined DMRS pattern. The UE 115-d may determine that a subsequent control channel in a subsequent TTI includes information for UE 115-d. UE 115-d may blindly decode the subsequent control channel using a DMRS from the pre-defined DMRS pattern.

Figure 9:
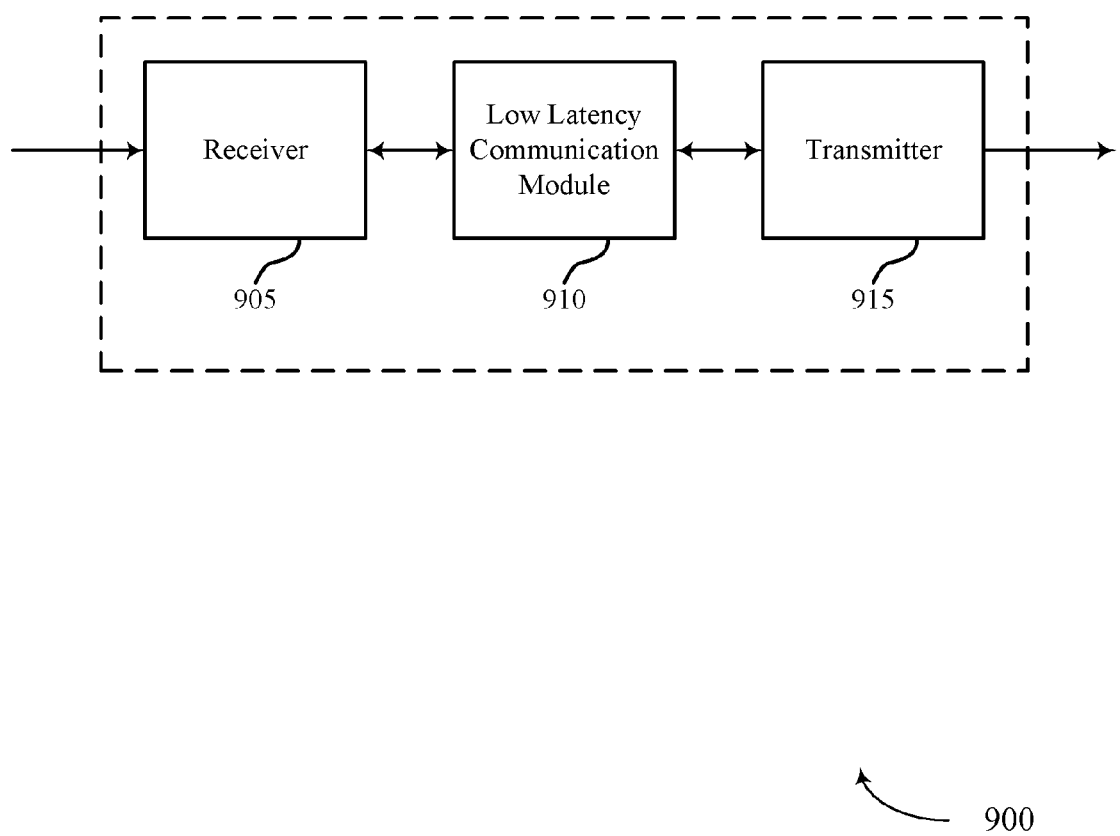
FIGS. 9-11 show block diagrams of a wireless device or devices that support two-symbol TTI operation for low latency communication in accordance with various aspects of the present disclosure.

FIG. 9 shows a block diagram of a wireless device 900 that supports low latency communications in accordance with various aspects of the present disclosure. Wireless device 900 may be an example of aspects of a device, such as a UE 115 or base station 105, described with reference to FIGS. 1-8. Wireless device 900 may include a receiver 905, a low latency communication module 910, or a transmitter 915. Wireless device 900 may also include a processor. Each of these components may be in communication with one another.

The receiver 905 may receive information such as packets, user data, or control information associated with various information channels (e.g., control channels, data channels, and information related to two-symbol TTI operation for low latency, etc.). Information may be passed on to the low latency communication module 910, and to other components of wireless device 900.

The low latency communication module 910 may determine a communication link characteristic indicative of a first symbol of a two-symbol TTI, identify a location of the first symbol of the two-symbol TTI based on the determined communication link characteristic, and communicate during the first symbol and a second symbol of the two-symbol TTI based on the location of the first symbol.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
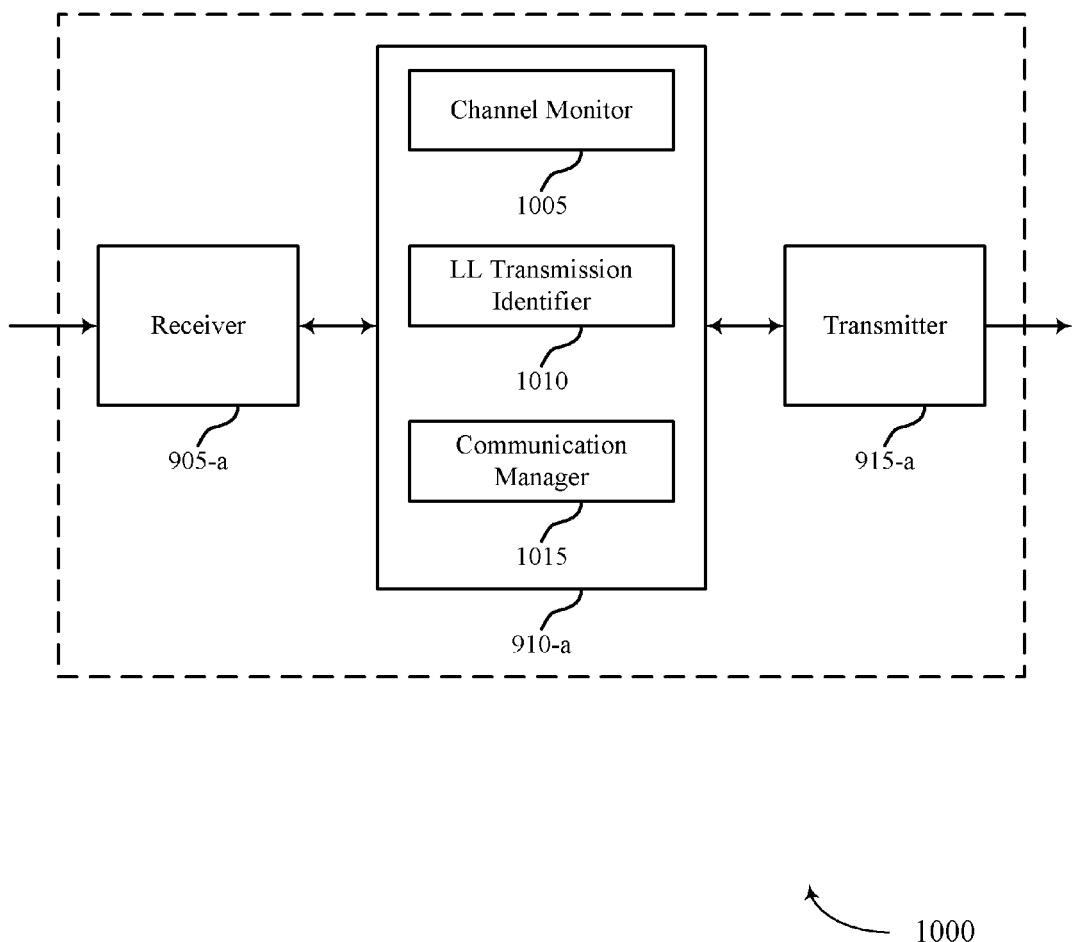

FIG. 10 shows a block diagram of a wireless device 1000 for two-symbol TTI operation for low latency communications in accordance with various aspects of the present disclosure. Wireless device 1000 may be an example of aspects of a wireless device 900, a UE 115, or a base station 105 as described with reference to FIGS. 1-9. Wireless device 1000 may include a receiver 905-a, a low latency communication module 910-a, or a transmitter 915-a. Wireless device 1000 may also include a processor. Each of these components may be in communication with one another. The low latency communication module 910-a may also include a channel monitor 1005, a low latency (LL) transmission identifier 1010, and a communication manager 1015.

The receiver 905-a may receive information which may be passed on to low latency communication module 910-a, and to other components of wireless device 1000. The low latency communication module 910-a may perform the operations described with reference to FIG. 9. The transmitter 915-a may transmit signals received from other components of wireless device 1000.

The channel monitor 1005 may determine a communication link characteristic indicative of a first symbol of a two-symbol TTI as described with reference to FIGS. 2-8. In some examples, the communication link characteristic determination may be based on a reference signal type, a channel type, a direction of a communication link, or any combination thereof. The channel monitor 1005 may also monitor a CRS-based channel in a first set of symbols of a subframe comprising the two-symbol TTI. The channel monitor 1005 may also monitor a DMRS-based channel in a second set of symbols of the subframe comprising the two-symbol TTI. In some examples, the second set of symbols may be a subset of the first set of symbols. Monitoring the CRS-based channel may comprise blindly decoding a first subset of possible decoding candidates and monitoring the DMRS-based channel may include blindly decoding a second subset of possible decoding candidates. The channel monitor 1005 may also determine a communication link characteristic indicative of a first symbol of a two-symbol TTI. In some examples, the communication link characteristic determination may be based on a reference signal type, a channel type, a direction of a communication link, or any combination thereof.

The low latency transmission identifier 1010 may identify a location of the first symbol of the two-symbol TTI based on the determined communication link characteristic as described with reference to FIGS. 2-8. In some examples, the location of the first symbol of the two-symbol TTI within a subframe may be unrestricted. Alternatively the location of the first symbol of the two-symbol TTI may be restricted to a subset of symbols of a subframe that includes the two-symbol TTI. In some examples, the restriction on the location of the first symbol may be based on a DMRS pattern of the subframe. The location of the first symbol of the two-symbol TTI may be semi-statically or dynamically determined. Additionally or alternatively, the location of the first symbol of the two-symbol TTI may be based on a cyclic prefix type or a subframe type, or both. In some cases, the location of the first symbol of the two-symbol TTI may be based at least in part on a UE identifier.

The communication manager 1015 may communicate during the first symbol and a second symbol of the two-symbol TTI based at least in part on the location of the first symbol as described with reference to FIGS. 2-8. The communication manager 1015 may also communicate during the first symbol and a second symbol of the two-symbol TTI based at least in part on the location of the first symbol.

Figure 11:
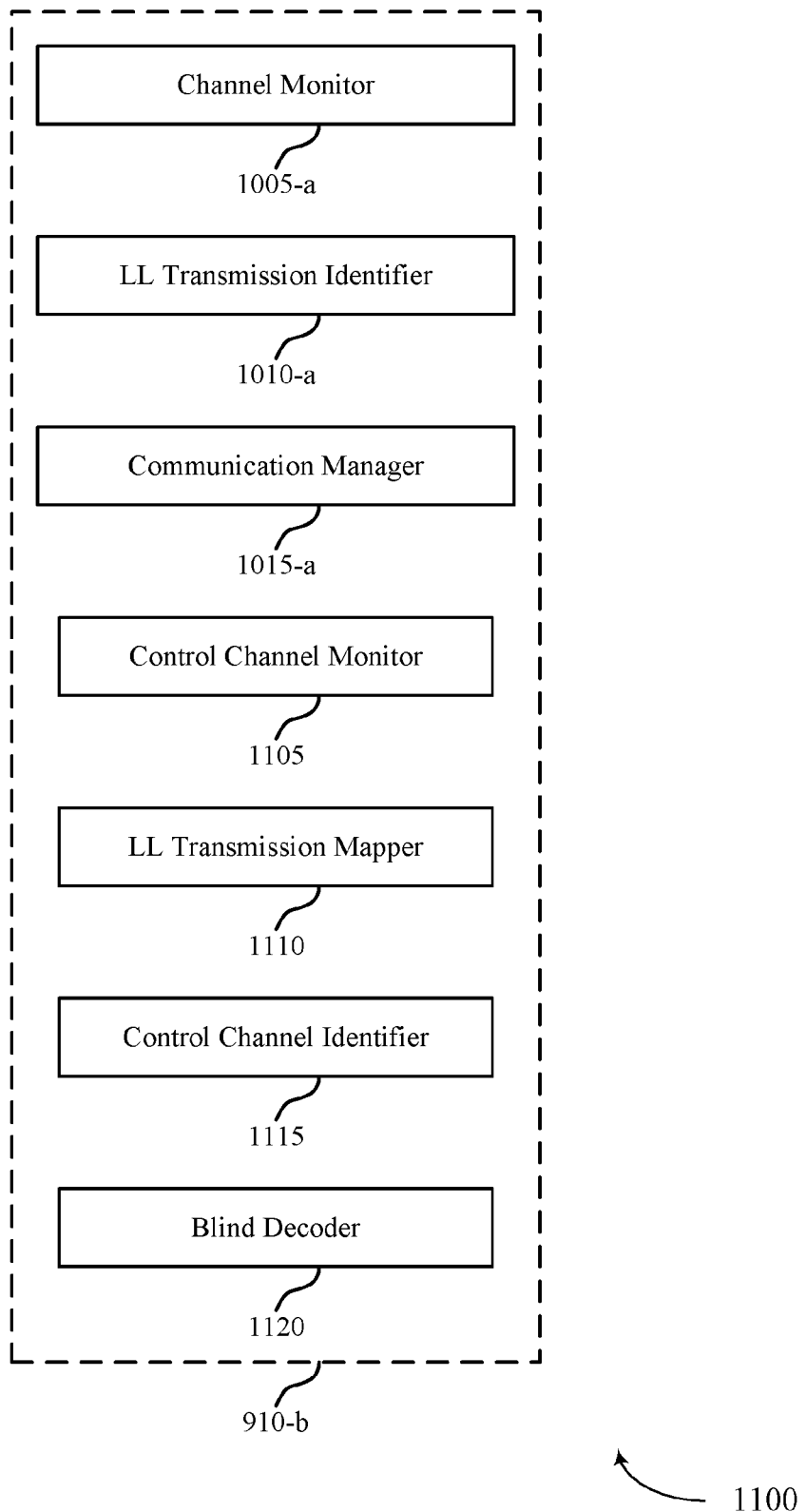

FIG. 11 shows a block diagram 1100 of a low latency communication module 910-*b* which may be a component of a wireless device 900 or a wireless device 1000 for two-symbol TTI operation for low latency communications in accordance with various aspects of the present disclosure. The low latency communication module 910-*b* may be an example of aspects of a low latency communication module 910 described with reference to FIGS. 9-10. The low latency communication module 910-*b* may include a channel monitor 1005-*a*, a low latency transmission identifier 1010-*a*, and a communication manager 1015-*a*. Each of these modules may perform the functions described with reference to FIG. 10. The low latency communication module 910-*b* may also include a control channel monitor 1105, a low latency (LL) transmission mapper 1110, a control channel identifier 1115, and a blind decoder 1120.

The control channel monitor 1105 may monitor a control channel in each symbol of a subframe, wherein the subframe includes the two-symbol TTI as described with reference to FIGS. 2-8. In some examples, the control channel includes a CRS-based control channel scheduling a CRS-based downlink channel or an uplink channel, or both. The control channel monitor 1105 may also monitor a CRS-based control channel scheduling a DMRS-based downlink channel, a DMRS-based control channel scheduling a downlink channel, or a DMRS-based control channel scheduling an uplink channel; the communication link characteristic may be determined based on the monitoring. The control channel monitor 1105 may, in some examples, determine that the first and second symbol to the two-symbol TTI include a data channel. In some examples, the control channel monitor 1105 may refrain from monitoring a control channel for a downlink grant period of the two-symbol TTI. The control channel monitor 1105 may also monitor the set of decoding candidates for the control channel, based on a pre-defined DMRS pattern for each decoding candidate of the set of decoding candidates. The control channel monitor 1105 may also monitor the TTI for a DMRS is based on a DMRS mode. In some examples, the DMRS mode includes a first mode that comprises a DMRS port for each RB in a set of RBs or a second mode that includes more than one DMRS port for each RB in a set of RBs. In some examples, the monitoring comprises monitoring a first set of RBs using the first mode and a second set of RBs using the second mode.

The low latency transmission mapper 1110 may select a location of the first symbol of the two-symbol TTI based on the determined communication link characteristic as described with reference to FIGS. 2-8. In some examples, the location of the first symbol of the two-symbol TTI may be restricted to a subset of symbols of a subframe that includes the two-symbol TTI. In some examples, the restriction on the location of the first symbol may be based at least in part on a DMRS pattern of the subframe.

The control channel identifier 1115 may identify a set of decoding candidates for a control channel with a TTI that is less than a subframe duration, as described with reference to FIGS. 2-8. The control channel identifier 1115 may also determine that a subsequent control channel in a subsequent TTI includes information for the wireless device 900 or 1000.

The blind decoder 1120 may blindly decode the control channel using the set of decoding candidates and the pre-defined DMRS pattern as described with reference to FIGS. 2-8. The blind decoder 1120 may also blindly decode a subsequent control channel using a DMRS from the pre-defined DMRS pattern.

Figure 12:
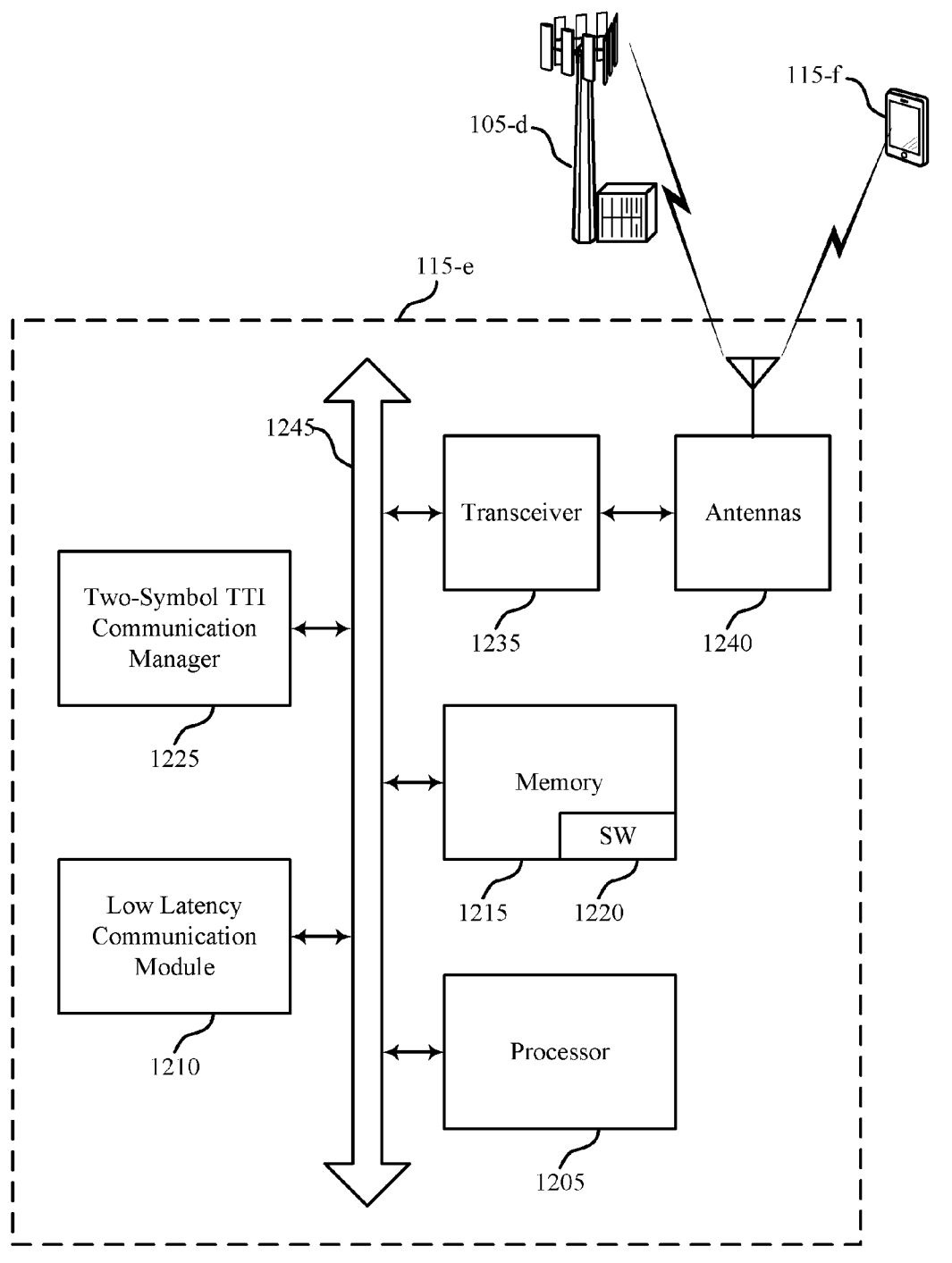
FIG. 12 illustrates a block diagram of a system, including a UE, that supports low latency communication in accordance with various aspects of the present disclosure.

FIG. 12 shows a diagram of a system 1200 including a UE 115-*e* that supports low latency communications in accordance with various aspects of the present disclosure. System 1200 may include UE 115-*e*, which may be an example of a wireless device 900, a wireless device 1000, or a UE 115 described with reference to FIGS. 1, 2, and 9-11. UE 115-*e* may include a low latency communication module 1210, which may be an example of a low latency communication module 910 described with reference to FIGS. 9-11. UE 115-*e* may also include a two-symbol TTI communication manager 1225. UE 115-*e* may also include components for bi-directional voice and data communications including components for transmitting communications and components for receiving communications. For example, UE 115-*e* may communicate bi-directionally with base station 105-*d* or UE 115-*f*.

UE 115-*e* may also include a processor 1205, and memory 1215 (including software (SW) 1220), a transceiver 1235, and one or more antenna(s) 1240, each of which may communicate, directly or indirectly, with one another (e.g., via buses 1245). The transceiver 1235 may communicate bi-directionally, via the antenna(s) 1240 or wired or wireless links, with one or more networks, as described above. For example, the transceiver 1235 may communicate bi-directionally with a base station 105 or another UE 115. The transceiver 1235 may include a modem to modulate the packets and provide the modulated packets to the antenna(s) 1240 for transmission, and to demodulate packets received from the antenna(s) 1240. While UE 115-*e* may include a single antenna 1240, UE 115-*e* may also have multiple antennas 1240 capable of concurrently transmitting or receiving multiple wireless transmissions. Two-symbol TTI communication manager 1225

The memory 1215 may include random access memory (RAM) and read only memory (ROM). The memory 1215 may store computer-readable, computer-executable software/firmware code 1220 including instructions that, when executed, cause the processor 1205 to perform various functions described herein (e.g., two-symbol TTI operation for low latency, DMRS-based uPDCCH operation, etc.). Alternatively, the software/firmware code 1220 may not be directly executable by the processor 1205 but cause a computer (e.g., when compiled and executed) to perform functions described herein. The processor 1205 may include an intelligent hardware device, (e.g., a central processing unit (CPU), a microcontroller, an application specific integrated circuit (ASIC), etc.)

Figure 13:
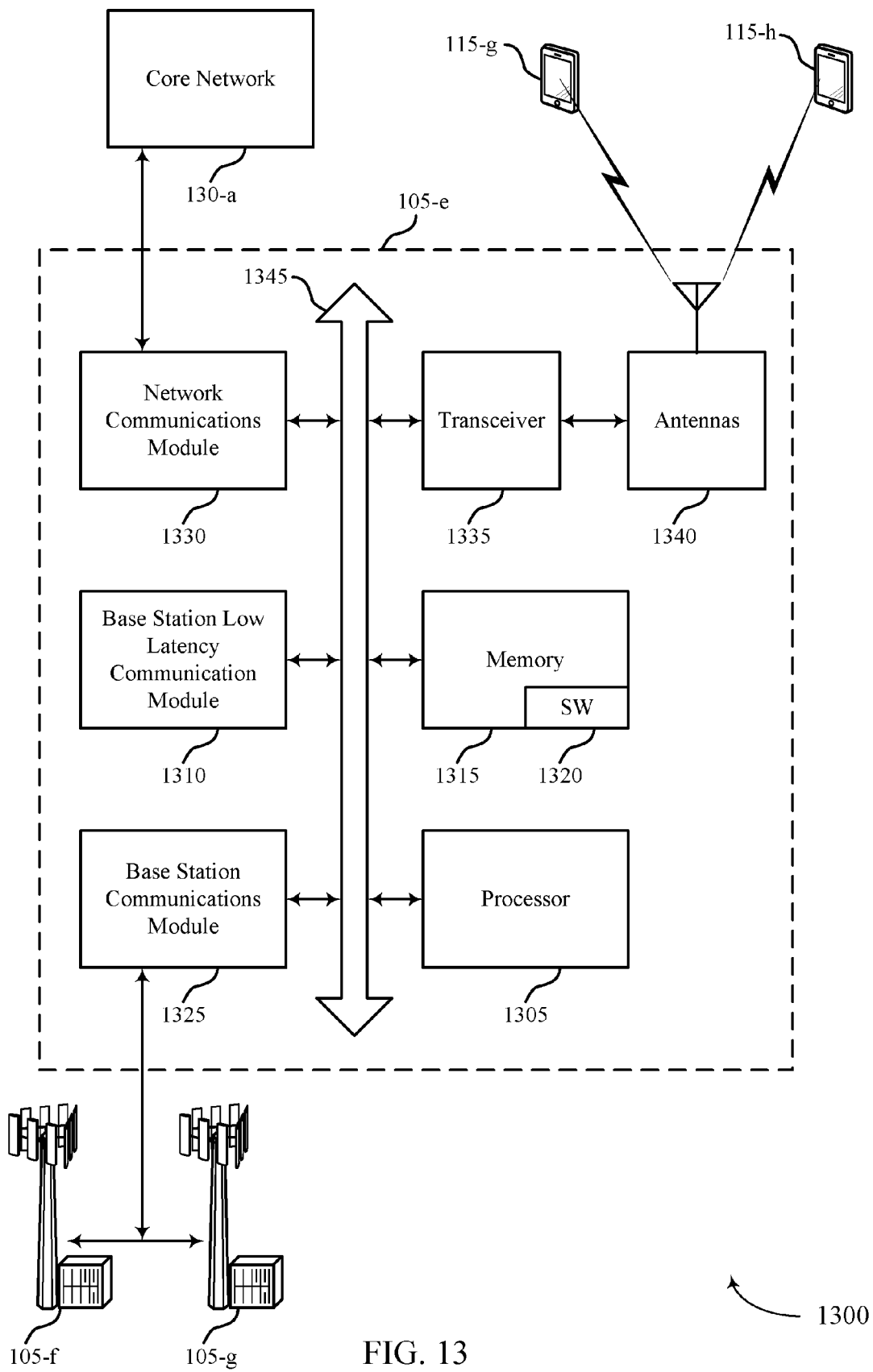
FIG. 13 illustrates a block diagram of a system, including a base station, that supports low latency communication in accordance with various aspects of the present disclosure.

FIG. 13 shows a diagram of a system 1300 including a base station 105-*e* that supports low latency communications in accordance with various aspects of the present disclosure. System 1300 may include base station 105-*e*, which may be an example of a wireless device 900, a wireless device 1000, or a base station 105 described with reference to FIGS. 1, 2 and 10-12. Base station 105-*e* may include a base station low latency communication module 1310, which may be an example of a base station low latency communication module 1310 described with reference to FIGS. 10-12. Base station 105-*e* may also include components for bi-directional voice and data communications including components for transmitting communications and components for receiving communications. For example, base station 105-*e* may communicate bi-directionally with UE 115-*g*, UE 115-*h*, base station 105-*f*, or base station 105-*g*.

In some cases, base station 105-*e* may have one or more wired backhaul links. Base station 105-*e* may have a wired backhaul link (e.g., S1 interface, etc.) to the core network 130. Base station 105-*e* may also communicate with other base stations 105, such as base station 105-*f* and base station 105-*g*, via inter-base station backhaul links (e.g., an X2 interface). Each of the base stations 105 may communicate with UEs 115 using the same or different wireless communications technologies. In some cases, base station 105-*e* may communicate with other base stations such as 105-*f* or 105-*g* utilizing base station communications module 1325. In some examples, base station communications module 1325 may provide an X2 interface within a Long Term Evolution (LTE)/LTE-A wireless communication network technology to provide communication between some of the base stations 105. In some examples, base station 105-*e* may communicate with other base stations through core network 130. In some cases, base station 105-*e* may communicate with the core network 130 through network communications module 1330.

The base station 105-*e* may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-*e*) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-*e* may include multiple transceivers 1335, each with one or more associated antennas 1340. The transceiver may be an example of a combined receiver 905 and transmitter 915 of FIG. 9.

The memory 1315 may include RAM and ROM. The memory 1315 may also store computer-readable, computer-executable software code 1320 containing instructions that are configured to, when executed, cause the processor 1305 to perform various functions described herein (e.g., two-symbol TTI operation for low latency, selecting coverage enhancement techniques, call processing, database management, message routing, etc.). Alternatively, the software code 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processor (DSPs), and the like.

The base station communications module 1325 may manage communications with other base stations 105. In some cases, a communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

The components of wireless device 900, wireless device 1000, low latency communication module 910-*b*, UE 115-*e*, or base station 105-*e* may each, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
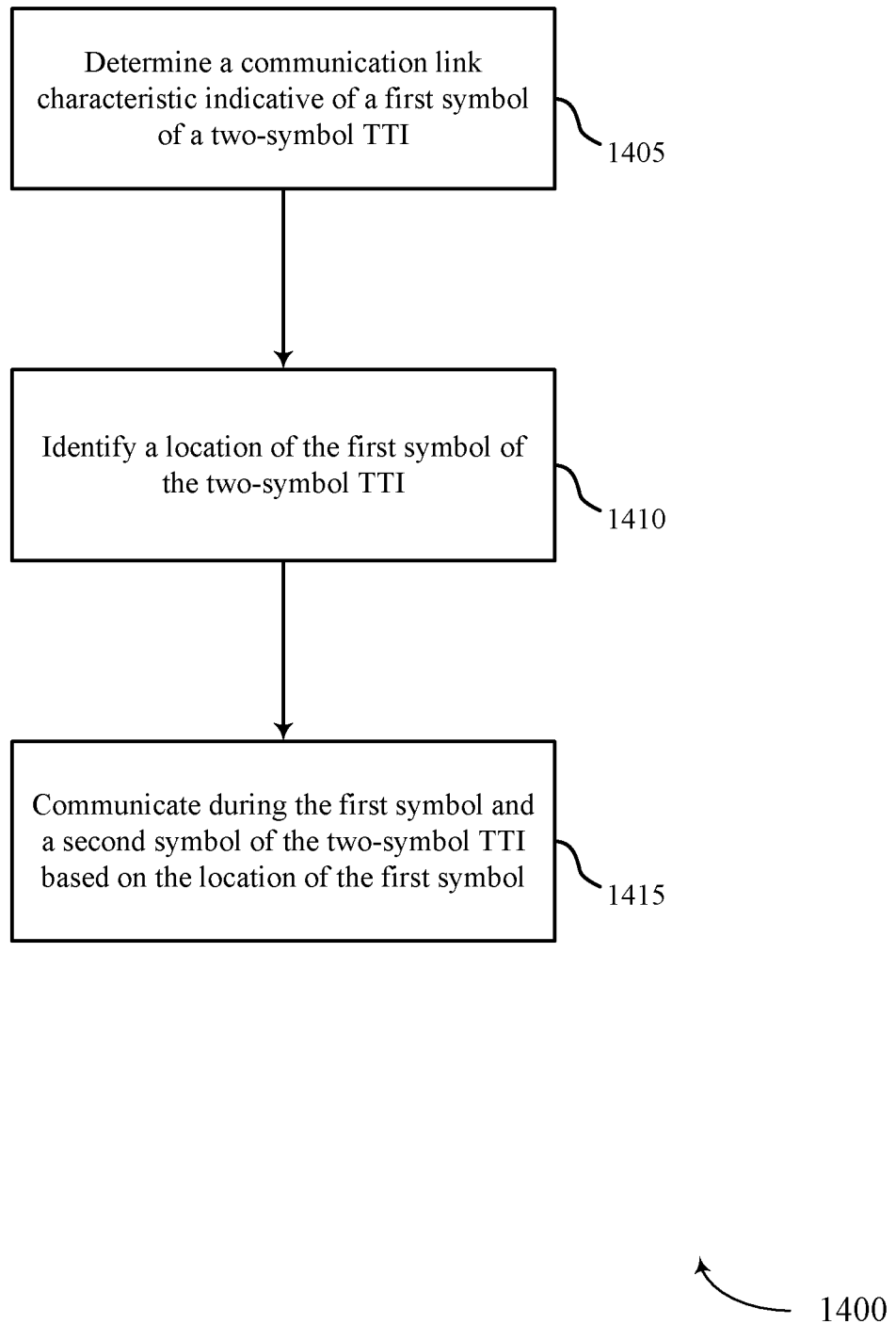
FIGS. 14-19 illustrate methods for low latency communication in accordance with various aspects of the present disclosure.

FIG. 14 shows a flowchart illustrating a method 1400 for low latency communications in accordance with various aspects of the present disclosure. The operations of method 1400 may be implemented by a device, such as a UE 115 or its components as described with reference to FIGS. 1-13. For example, the operations of method 1400 may be performed by the low latency communication module 910 as described with reference to FIGS. 9-12. In some examples, a device may execute a set of codes to control the functional elements of the device to perform the functions described below. Additionally or alternatively, the device may perform aspects the functions described below using special-purpose hardware.

At block 1405, the UE 115 may determine a communication link characteristic indicative of a first symbol of a two-symbol TTI as described with reference to FIGS. 2-8. In certain examples, the operations of block 1405 may be performed by the channel monitor 1005 as described with reference to FIG. 10.

At block 1410, the UE 115 may identify a location of the first symbol of the two-symbol TTI based at least in part on the determined communication link characteristic as described with reference to FIGS. 2-8. In certain examples, the operations of block 1410 may be performed by the low latency transmission identifier 1010 as described with reference to FIG. 10.

At block 1415, the UE 115 may communicate during the first symbol and a second symbol of the two-symbol TTI based at least in part on the location of the first symbol as described with reference to FIGS. 2-8. In certain examples, the operations of block 1415 may be performed by the communication manager 1015 as described with reference to FIG. 10 or transceiver 1235 as described with reference to FIG. 12.

Figure 15:
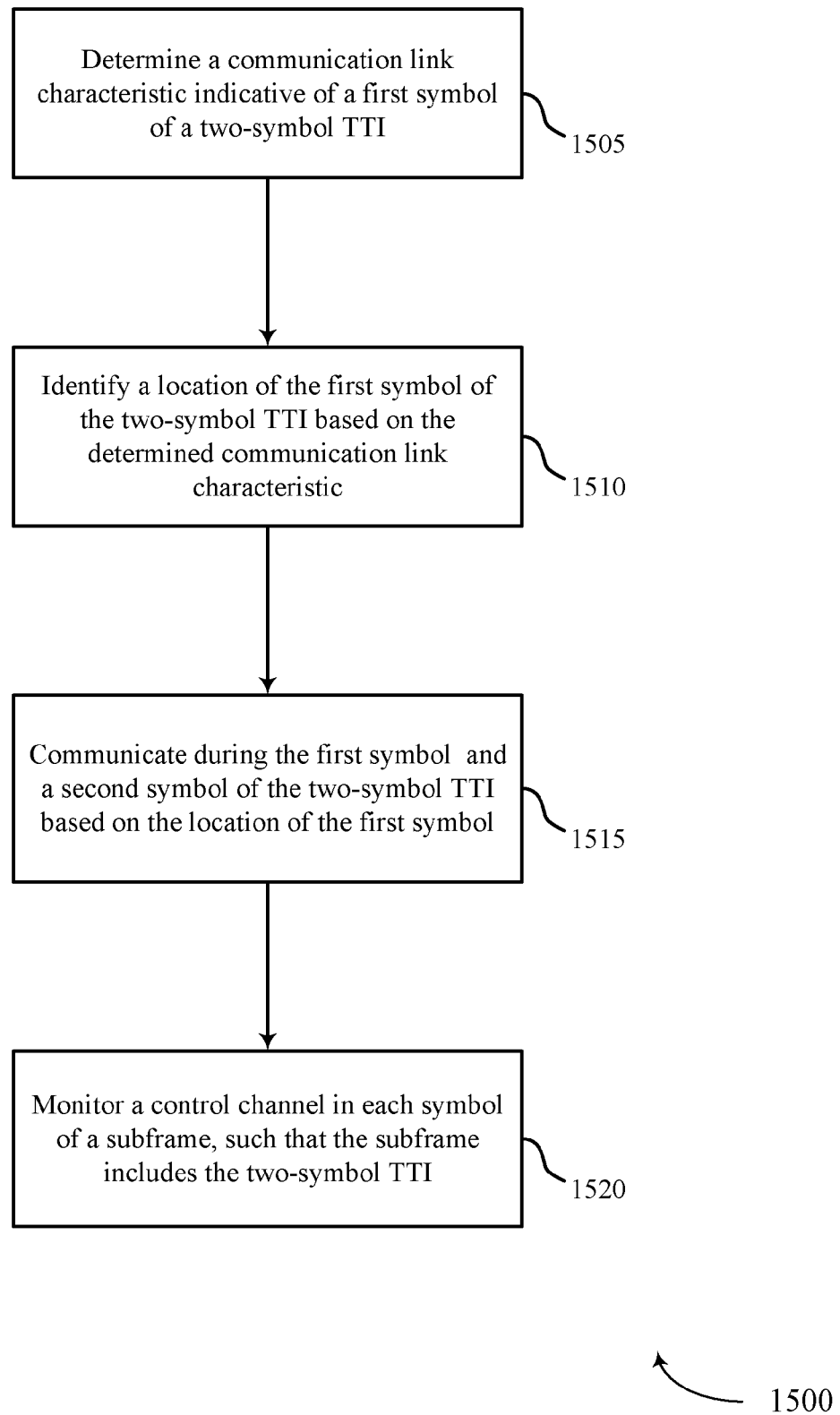

FIG. 15 shows a flowchart illustrating a method 1500 low latency communications in accordance with various aspects of the present disclosure. The operations of method 1500 may be implemented by a device, such as a UE 115 or its components as described with reference to FIGS. 1-13. For example, the operations of method 1500 may be performed by the low latency communication module 910 as described with reference to FIGS. 9-12. In some examples, a device may execute a set of codes to control the functional elements of the device to perform the functions described below. Additionally or alternatively, the device may perform aspects the functions described below using special-purpose hardware. The method 1500 may also incorporate aspects of method 1400 of FIG. 14.

At block 1505, the UE 115 may determine a communication link characteristic indicative of a first symbol of a two-symbol TTI as described with reference to FIGS. 2-8. In certain examples, the operations of block 1505 may be performed by the channel monitor 1005 as described with reference to FIG. 10.

At block 1510, the device may identify a location of the first symbol of the two-symbol TTI based at least in part on the determined communication link characteristic as described with reference to FIGS. 2-8. In certain examples, the operations of block 1510 may be performed by the low latency transmission identifier 1010 as described with reference to FIG. 10.

At block 1515, the UE 115 may communicate during the first symbol and a second symbol of the two-symbol TTI based at least in part on the location of the first symbol as described with reference to FIGS. 2-8. In certain examples, the operations of block 1515 may be performed by the communication manager 1015 as described with reference to FIG. 10 or transceiver 1235 as described with reference to FIG. 12.

At block 1520, the UE 115 may monitor a control channel in each symbol of a subframe, wherein the subframe includes the two-symbol TTI as described with reference to FIGS. 2-8. In certain examples, the operations of block 1520 may be performed by the control channel monitor 1105 as described with reference to FIG. 11.

Figure 16:
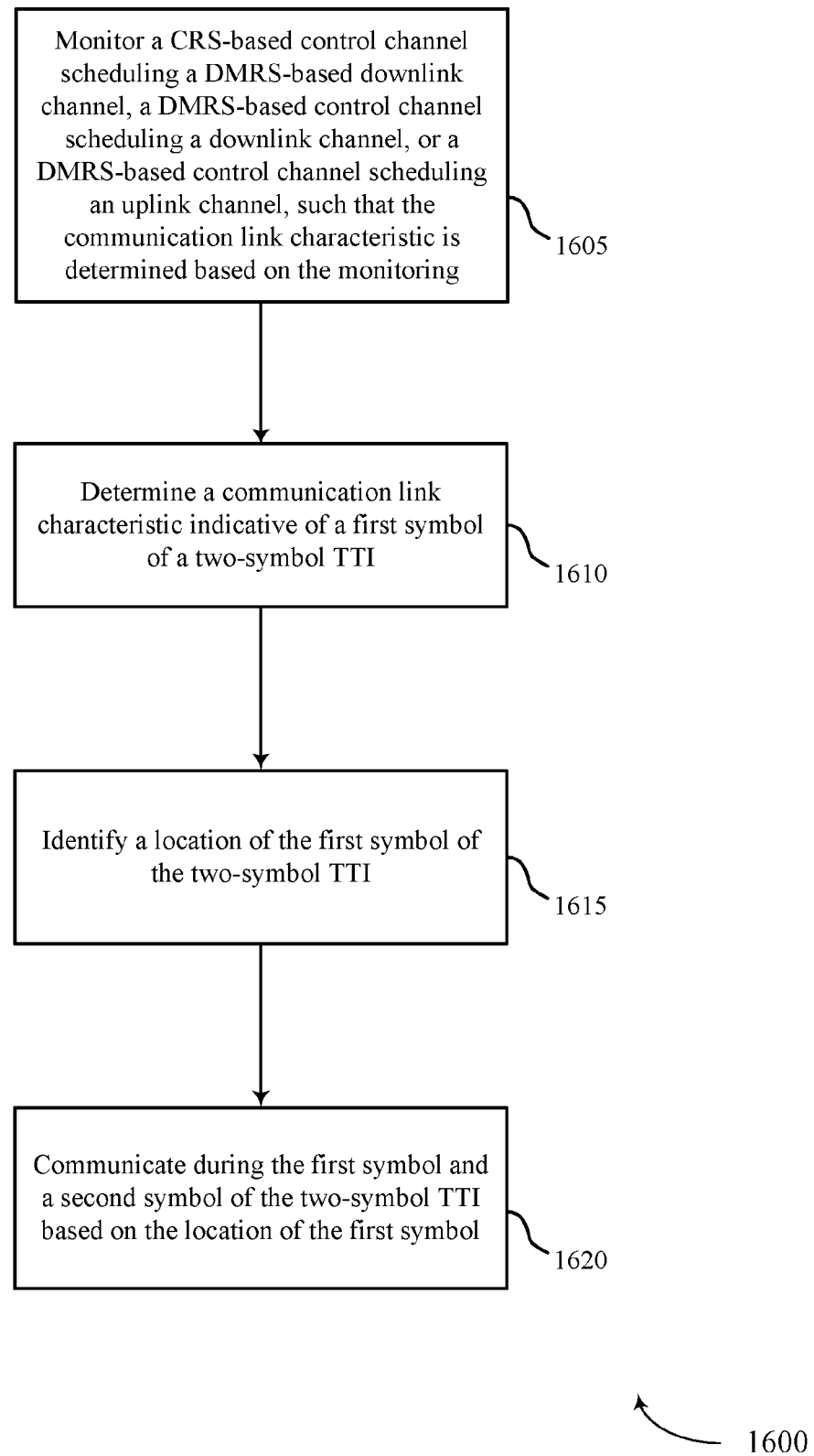

FIG. 16 shows a flowchart illustrating a method 1600 for low latency communications in accordance with various aspects of the present disclosure. The operations of method 1600 may be implemented by a device, such as a UE 115 or its components as described with reference to FIGS. 1-13. For example, the operations of method 1600 may be performed by the low latency communication module 910 as described with reference to FIGS. 9-12. In some examples, a device may execute a set of codes to control the functional elements of the device to perform the functions described below. Additionally or alternatively, the device may perform aspects the functions described below using special-purpose hardware. The method 1600 may also incorporate aspects of methods 1400, and 1500 of FIGS. 14-15.

At block 1605, the UE 115 may monitor a CRS-based control channel scheduling a DMRS-based downlink channel, a DMRS-based control channel scheduling a downlink channel, or a DMRS-based control channel scheduling an uplink channel, wherein the communication link characteristic is determined based at least in part on the monitoring as described with reference to FIGS. 2-8. In certain examples, the operations of block 1605 may be performed by the control channel monitor 1105 as described with reference to FIG. 11.

At block 1610, the UE 115 may determine a communication link characteristic indicative of a first symbol of a two-symbol TTI as described with reference to FIGS. 2-8. In certain examples, the operations of block 1610 may be performed by the channel monitor 1005 as described with reference to FIG. 10.

At block 1615, the UE 115 may identify a location of the first symbol of the two-symbol TTI based at least in part on the determined communication link characteristic as described with reference to FIGS. 2-8. In certain examples, the operations of block 1615 may be performed by the low latency transmission identifier 1010 as described with reference to FIG. 10.

At block 1620, the UE 115 may communicate during the first symbol and a second symbol of the two-symbol TTI based at least in part on the location of the first symbol as described with reference to FIGS. 2-8. In certain examples, the operations of block 1620 may be performed by the communication manager 1015 as described with reference to FIG. 10 or transceiver 1235 as described with reference to FIG. 12.

Figure 17:
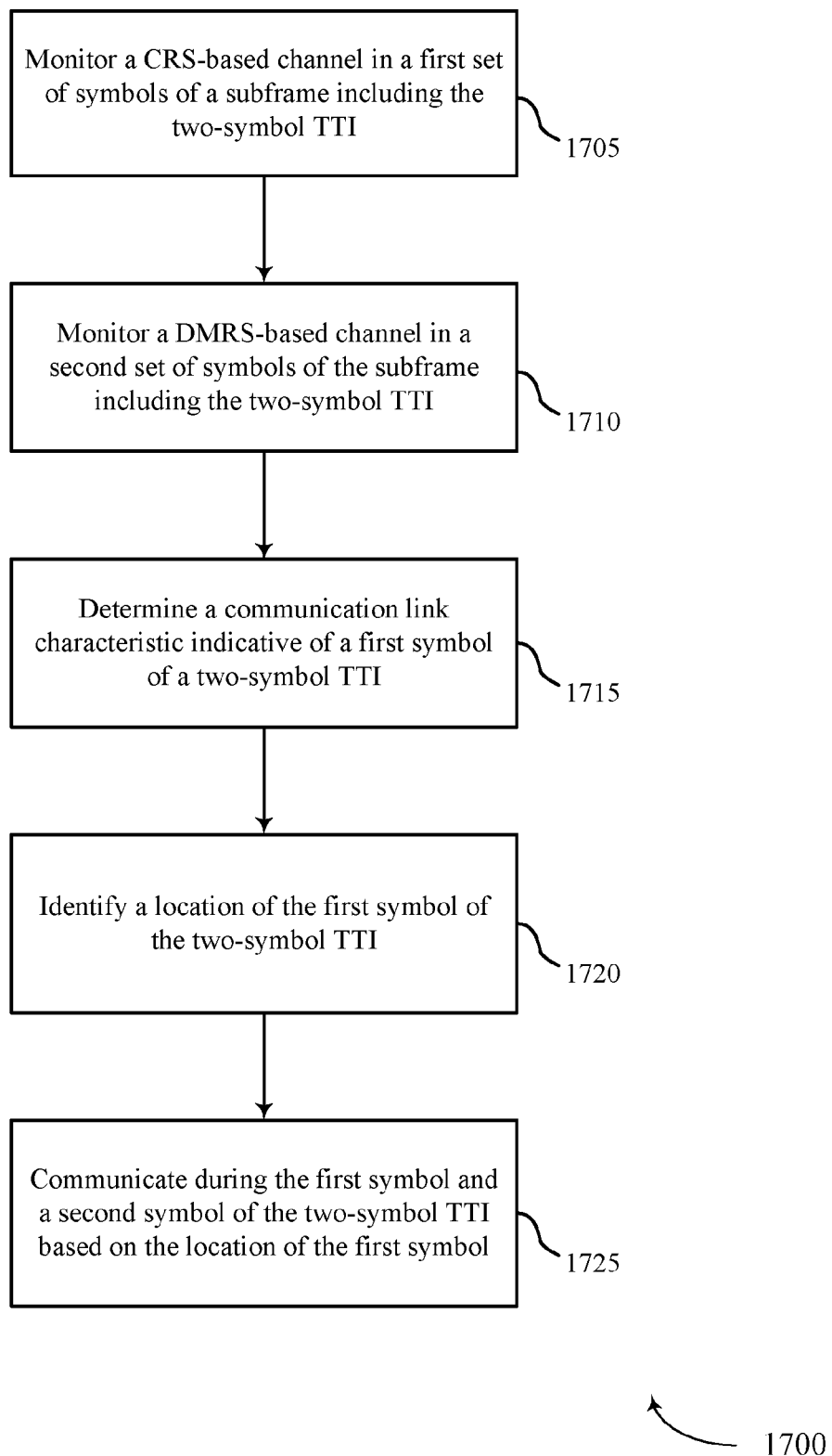

FIG. 17 shows a flowchart illustrating a method 1700 for low latency communications in accordance with various aspects of the present disclosure. The operations of method 1700 may be implemented by a device, such as a UE 115 or its components as described with reference to FIGS. 1-13. For example, the operations of method 1700 may be performed by the low latency communication module 910 as described with reference to FIGS. 9-12. In some examples, a device may execute a set of codes to control the functional elements of the device to perform the functions described below. Additionally or alternatively, the device may perform aspects the functions described below using special-purpose hardware. The method 1700 may also incorporate aspects of methods 1400, 1500, and 1600 of FIGS. 14-16.

At block 1705, the UE 115 may monitor a CRS-based channel in a first set of symbols of a subframe comprising the two-symbol TTI as described with reference to FIGS. 2-8. In certain examples, the operations of block 1705 may be performed by the channel monitor 1005 as described with reference to FIG. 10.

At block 1710, the UE 115 may monitor a DMRS-based channel in a second set of symbols of the subframe comprising the two-symbol TTI as described with reference to FIGS. 2-8. In certain examples, the operations of block 1710 may be performed by the channel monitor 1005 as described with reference to FIG. 10.

At block 1715, the UE 115 may determine a communication link characteristic indicative of a first symbol of a two-symbol TTI as described with reference to FIGS. 2-8. In certain examples, the operations of block 1715 may be performed by the channel monitor 1005 as described with reference to FIG. 10.

At block 1720, the UE 115 may identify a location of the first symbol of the two-symbol TTI based at least in part on the determined communication link characteristic as described with reference to FIGS. 2-8. In certain examples, the operations of block 1720 may be performed by the low latency transmission identifier 1010 as described with reference to FIG. 10.

At block 1725, the UE 115 may communicate during the first symbol and a second symbol of the two-symbol TTI based at least in part on the location of the first symbol as described with reference to FIGS. 2-8. In certain examples, the operations of block 1725 may be performed by the communication manager 1015 as described with reference to FIG. 10 or transceiver 1235 as described with reference to FIG. 12.

Figure 18:
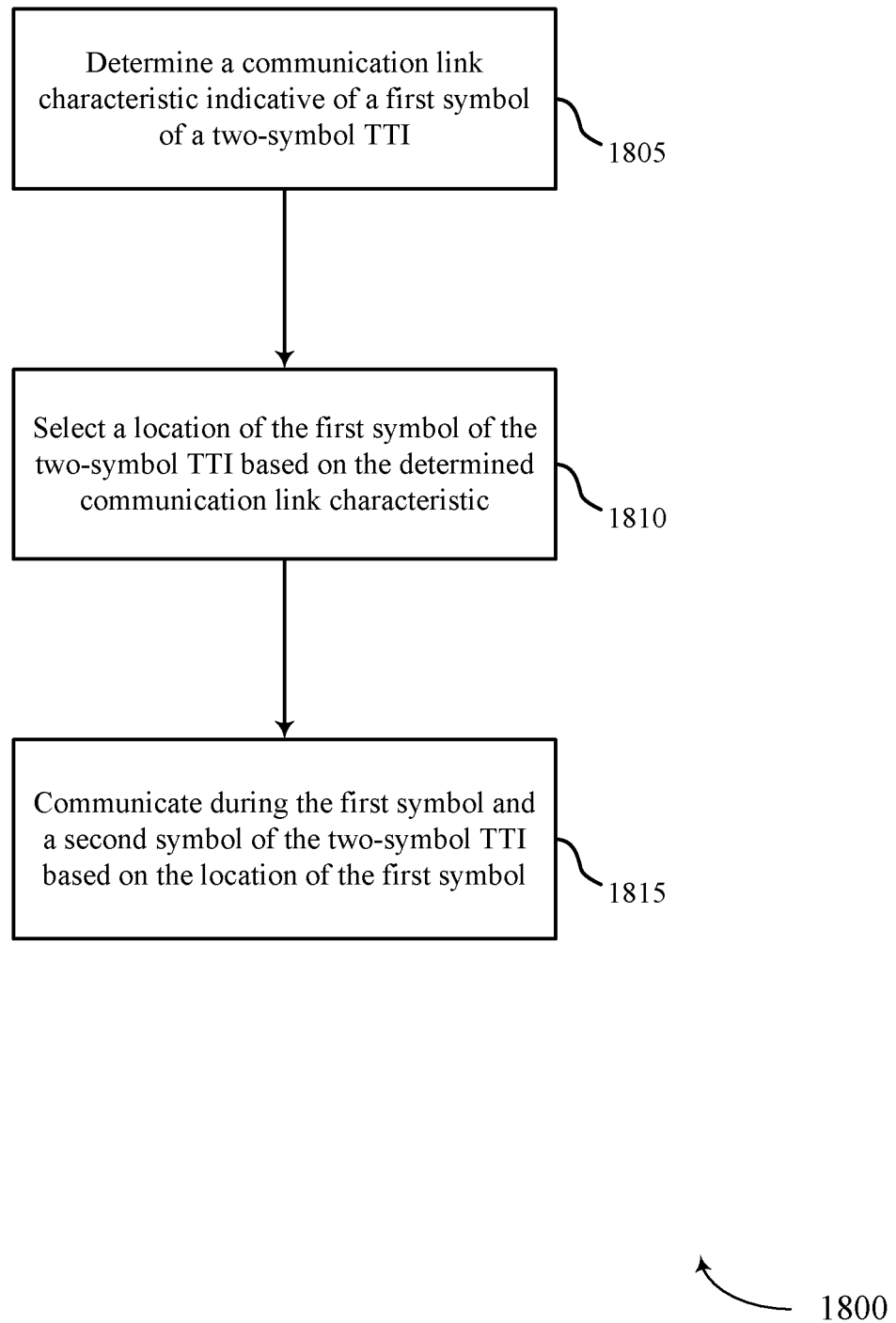

FIG. 18 shows a flowchart illustrating a method 1800 for low latency communications in accordance with various aspects of the present disclosure. The operations of method 1800 may be implemented by a device, such as a base station 105 or its components as described with reference to FIGS. 1-13. For example, the operations of method 1800 may be performed by the low latency communication module 910 as described with reference to FIGS. 9-12. In some examples, a device may execute a set of codes to control the functional elements of the device to perform the functions described below. Additionally or alternatively, the device may perform aspects the functions described below using special-purpose hardware.

At block 1805, the base station 105 may determine a communication link characteristic indicative of a first symbol of a two-symbol TTI as described with reference to FIGS. 2-8. In certain examples, the operations of block 1805 may be performed by the channel monitor 1005 as described with reference to FIG. 10.

At block 1810, the base station 105 may select a location of the first symbol of the two-symbol TTI based at least in part on the determined communication link characteristic as described with reference to FIGS. 2-8. In certain examples, the operations of block 1810 may be performed by the low latency transmission mapper 1110 as described with reference to FIG. 11.

At block 1815, the base station 105 may communicate during the first symbol and a second symbol of the two-symbol TTI based at least in part on the location of the first symbol as described with reference to FIGS. 2-8. In certain examples, the operations of block 1815 may be performed by the communication manager 1015 as described with reference to FIG. 10 or transceiver 1335 as described with reference to FIG. 13.

Figure 19:
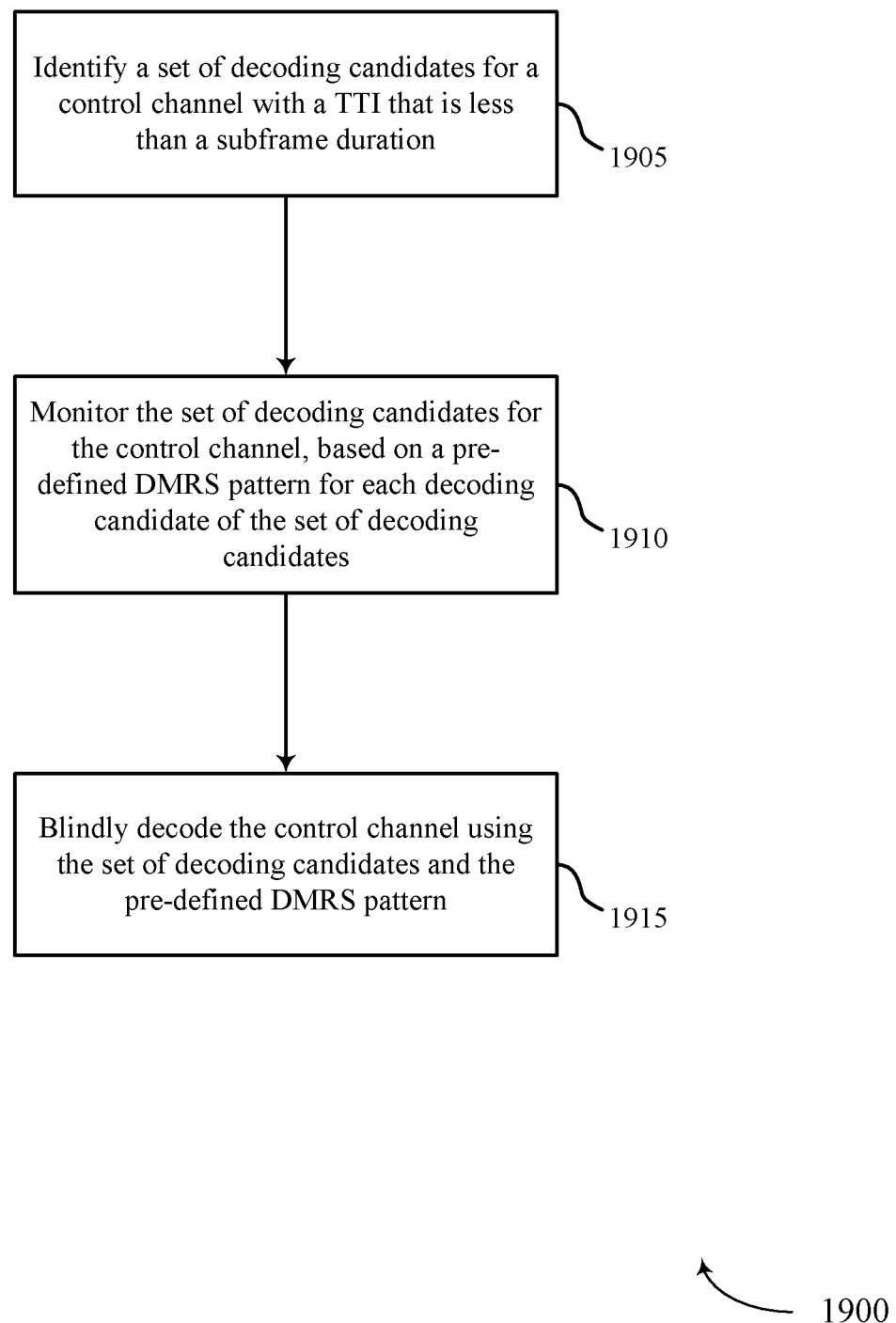

FIG. 19 shows a flowchart illustrating a method 1900 for low latency communications in accordance with various aspects of the present disclosure. The operations of method 1900 may be implemented by a device, such as a UE 115 or its components as described with reference to FIGS. 1-13. For example, the operations of method 1900 may be performed by the low latency communication module 910 as described with reference to FIGS. 9-12. In some examples, a device may execute a set of codes to control the functional elements of the device to perform the functions described below. Additionally or alternatively, the device may perform aspects the functions described below using special-purpose hardware.

At block 1905, the UE 115 may identify a set of decoding candidates for a control channel with a TTI that is less than a subframe duration as described with reference to FIGS. 2-8. In certain examples, the operations of block 1905 may be performed by the control channel identifier 1115 as described with reference to FIG. 11.

At block 1910, the UE 115 may monitor the set of decoding candidates for the control channel, based at least in part on at least one pre-defined DMRS pattern for each decoding candidate of the set of decoding candidates as described with reference to FIGS. 2-8. In certain examples, the operations of block 1910 may be performed by the control channel monitor 1105 as described with reference to FIG. 11.

At block 1915, the UE 115 may blindly decode the control channel using the set of decoding candidates and the pre-defined DMRS pattern as described with reference to FIGS. 2-8. In certain examples, the operations of block 1915 may be performed by the blind decoder 1120 as described with reference to FIG. 11.

Thus, methods 1400, 1500, 1600, 1700, 1800, and 1900 may provide for two-symbol TTI operation for low latency. It should be noted that methods 1400, 1500, 1600, 1700, 1800, and 1900 describe possible implementation, and that the operations and the steps may be rearranged or otherwise modified such that other implementations are possible. In some examples, aspects from two or more of the methods 1400, 1500, 1600, 1700, 1800, and 1900 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LIE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   determining a communication link characteristic for a communication link in a system that supports a first transmission time interval (TTI) with two slots, and a second TTI that is less than or equal to one slot, wherein the first TTI includes the second TTI;
   identifying, based at least in part on the communication link characteristic, a location of a first symbol of the second TTI in the first TTI; and
   communicating during the first symbol and a second symbol of the second TTI based at least in part on the location of the first symbol.

2. The method of claim 1, wherein the communication link characteristic determination is based at least in part on: a reference signal type, a channel type, a direction of a communication link, or any combination thereof.

3. The method of claim 1, wherein the location of the first symbol of the second TTI within a subframe having the first TTI is unrestricted.

4. The method of claim 1, further comprising:
   monitoring a control channel in each symbol of a subframe having the first TTI, wherein the subframe includes the second TTI.

5. The method of claim 4, wherein the control channel comprises a cell-specific reference signal (CRS) based control channel scheduling a CRS-based downlink channel or an uplink channel, or both.

6. The method of claim 1, wherein the location of the first symbol of the second TTI is restricted to every other symbol period of a subframe having the first TTI and that includes the second TTI.

7. The method of claim 6, wherein the restriction on the location of the first symbol is based at least in part on a demodulation reference signal (DMRS) pattern of the subframe.

8. The method of claim 1, further comprising monitoring:
   a CRS based control channel scheduling a demodulation reference signal-based (DMRS-based) downlink channel, a DMRS-based control channel scheduling a downlink channel, or a DMRS-based control channel scheduling an uplink channel, wherein the communication link characteristic is determined based at least in part on the monitoring.

9. The method of claim 1, further comprising:
   determining that the first and second symbols of the second TTI comprise a data channel; and
   refraining from monitoring a control channel for at least a downlink grant period of the second TTI.

10. The method of claim 1, wherein the location of the first symbol of the second TTI is semi-statically or dynamically determined.

11. The method of claim 1, wherein the location of the first symbol of the second TTI is based at least in part on a cyclic prefix type or a subframe type, or both.

12. The method of claim 1, wherein the location of the first symbol of the second TTI is based at least in part on a user equipment (UE) identifier.

13. The method of claim 1, further comprising:
    monitoring a CRS-based channel in a first set of symbols of a subframe having the first TTI and comprising the second TTI; and
    monitoring a DMRS-based channel in a second set of symbols of the subframe having the first TTI and comprising the second TTI.

14. The method of claim 1, further comprising:
    identifying a set of decoding candidates for a control channel transmission associated with a transmission time interval (TTI) that is less than a subframe duration;
    monitoring the set of decoding candidates for the control channel transmission, based at least in part on at least one pre-defined demodulation reference signal (DMRS) pattern for each decoding candidate of the set of decoding candidates; and
    blindly decoding the control channel transmission using the set of decoding candidates and the at least one pre-defined DMRS pattern.

15. The method of claim 14, further comprising:
    determining that a subsequent control channel transmission associated with a subsequent TTI comprises information for the UE, wherein the subsequent control channel transmission is subsequent to the control channel transmission; and
    blindly decoding the subsequent control channel transmission using a DMRS associated with the at least one pre-defined DMRS pattern.

16. The method of claim 14, further comprising:
    monitoring the TTI for a DMRS is based at least in part on a DMRS mode.

17. The method of claim 14, wherein a resource element group (REG) comprises resource elements of a resource block of the TTI.

18. The method of claim 14, wherein the at least one pre-defined DMRS pattern depends on a subframe type or a cyclic prefix type, or both.

19. An apparatus for wireless communication, comprising:

means for determining a communication link characteristic for a communication link in a system that supports a first transmission time interval (TTI) with two slots, and a second TTI that is less than or equal to one slot, wherein the first TTI includes the second TTI;

means for identifying, based at least in part on the communication link characteristic, a location of a first symbol of the second TTI in the first TTI; and means for communicating during the first symbol and a second symbol of the second TTI based at least in part on the location of the first symbol.

20. An apparatus for wireless communication, comprising:

a processor;

memory in electronic communication with the processor; and instructions stored in the memory and operable, when executed by the processor, to cause the apparatus to:

determine a communication link characteristic for a communication link in a system that supports a first transmission time interval (TTI) with two slots, and a second TTI that is less than or equal to one slot, wherein the first TTI includes the second TTI;

identify, based at least in part on the communication link characteristic, a location of a first symbol of the second TTI in the first TTI; and communicate during the first symbol and a second symbol of the second TTI based at least in part on the location of the first symbol.

* * * * *